US009453131B2

(12) United States Patent
Geissler et al.

(10) Patent No.: US 9,453,131 B2
(45) Date of Patent: *Sep. 27, 2016

(54) PVD-METALLIC EFFECT PIGMENTS WITH DIFFRACTIVE STRUCTURE AND METAL NANOPARTICLES, PROCESS FOR PREPARING THEM AND USE THEREOF

(75) Inventors: Bernhard Geissler, Schwarzenbruck (DE); Martin Fischer, Koenigstein (DE); Frank Henglein, Nuremberg (DE); Ralph Schneider, Lauf (DE); Wolfgang Herzing, Neunkirchen (DE); Klaus Greiwe, Lauf (DE)

(73) Assignee: ECKART GMBH, Hartenstein (DE)

( * ) Notice: Subject to any disclaimer, the term of this patent is extended or adjusted under 35 U.S.C. 154(b) by 6 days.

This patent is subject to a terminal disclaimer.

(21) Appl. No.: 13/812,284

(22) PCT Filed: Jul. 21, 2011

(86) PCT No.: PCT/EP2011/062544
§ 371 (c)(1),
(2), (4) Date: Apr. 2, 2013

(87) PCT Pub. No.: WO2012/013568
PCT Pub. Date: Feb. 2, 2012

(65) Prior Publication Data
US 2013/0209790 A1    Aug. 15, 2013

(30) Foreign Application Priority Data

Jul. 27, 2010    (DE) ........................ 10 2010 032 399

(51) Int. Cl.
C09C 1/62    (2006.01)
B82Y 30/00    (2011.01)
(Continued)

(52) U.S. Cl.
CPC .................. *C09C 1/62* (2013.01); *B82Y 30/00* (2013.01); *C09C 1/0015* (2013.01); *C09C 1/0018* (2013.01); *C09D 5/36* (2013.01); *C09D 7/1225* (2013.01); *C09D 7/1266* (2013.01); *C09D 7/1275* (2013.01); *C01P 2002/85* (2013.01); *C01P 2004/03* (2013.01);
(Continued)

(58) Field of Classification Search
None
See application file for complete search history.

(56) References Cited

U.S. PATENT DOCUMENTS 4,430,366 A    2/1984 Crawford et al.
5,624,076 A    4/1997 Miekka et al.
(Continued)

FOREIGN PATENT DOCUMENTS

DE    693 16 359 T2    4/1998
DE    696 01 432 T2    10/1999
(Continued)

OTHER PUBLICATIONS

Machine translation JP 2004-284233 (2004).*
(Continued)

*Primary Examiner* — Alexandre Ferre
(74) *Attorney, Agent, or Firm* — The Webb Law Firm

(57) ABSTRACT

The invention relates to metallic effect pigment, the metallic effect pigment having at least one diffractive structure and at least one layer which comprises metal nanoparticles and metal oxide phase, the metal of the metal oxide phase and the metal of the metal nanoparticles in this at least one layer being identical. The invention further relates to a process for preparing these metallic effect pigments, to a coating composition, and to a coated article.

25 Claims, 24 Drawing Sheets

(51) Int. Cl.
*C09C 1/00* (2006.01)
*C09D 5/36* (2006.01)
*C09D 7/12* (2006.01)

(52) U.S. Cl.
CPC ...... *C01P 2004/04* (2013.01); *C01P 2004/64* (2013.01); *C01P 2006/62* (2013.01); *C01P 2006/65* (2013.01); *C01P 2006/66* (2013.01); *C09C 2200/1004* (2013.01); *C09C 2200/30* (2013.01); *C09C 2200/405* (2013.01); *C09C 2200/407* (2013.01); *C09C 2200/502* (2013.01); *C09C 2210/30* (2013.01); *C09C 2210/40* (2013.01); *C09C 2220/20* (2013.01); *Y10T 428/256* (2015.01); *Y10T 428/257* (2015.01); *Y10T 428/258* (2015.01)

(56) References Cited

U.S. PATENT DOCUMENTS

| | | | |
|---|---|---|---|
| 5,766,827 A | | 6/1998 | Bills et al. |
| 6,692,830 B2 | | 2/2004 | Argoitia et al. |
| 7,264,670 B2 | | 9/2007 | Ruger et al. |
| 2003/0031870 A1* | 2/2003 | Argoitia et al. ............ 428/403 |
| 2006/0034787 A1 | | 2/2006 | Bujard |
| 2006/0048676 A1 | | 3/2006 | Bujard |
| 2006/0053968 A1* | 3/2006 | Schuster et al. ................ 75/255 |
| 2006/0246149 A1* | 11/2006 | Buchholz et al. ............ 424/603 |
| 2007/0207099 A1 | | 9/2007 | Erker et al. |
| 2007/0259182 A1* | 11/2007 | Bujard et al. ................. 428/405 |
| 2009/0013906 A1 | | 1/2009 | Fischer et al. |
| 2010/0196296 A1 | | 8/2010 | Geissler et al. |

FOREIGN PATENT DOCUMENTS

| | | |
|---|---|---|
| DE | 10000592 A1 | 10/2000 |
| DE | 10 2004 055 291 A1 | 7/2005 |
| DE | 10 2007 007 908 A1 | 8/2007 |
| DE | 10 2007 034 928 A1 | 1/2009 |
| EP | 1144711 A1 | 10/2001 |
| EP | 1 522 606 A1 | 4/2005 |
| EP | 1 694 288 B1 | 4/2008 |
| JP | 2004284233 A * | 10/2004 |
| WO | 2004052999 A2 | 6/2004 |
| WO | 2004065492 A1 | 8/2004 |
| WO | WO 2008150011 A1 * | 12/2008 |
| WO | 2009012995 A1 | 1/2009 |
| WO | WO 2009012995 A1 * | 1/2009 |
| WO | WO 2010086165 A1 * | 8/2010 |

OTHER PUBLICATIONS

Barbara Parker, "Advances in Interference Color," Flex Products Inc., A JDSU Company, Santa Rosa, CA, Color Cosmetic Summit, Montréal (2003) pp. 1-10.

* cited by examiner

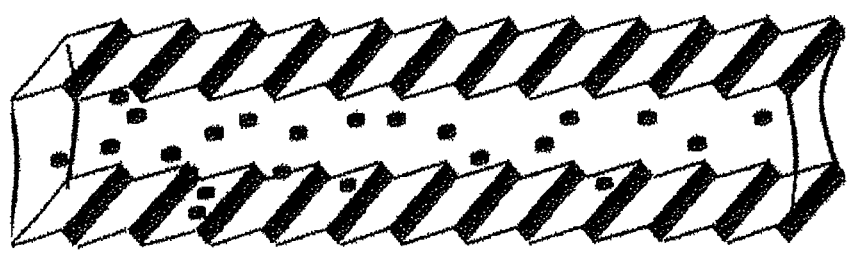
Figure 1
5  Embossed structure: 
Oxidic matrix: 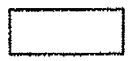
10  Metal nanoparticles: 

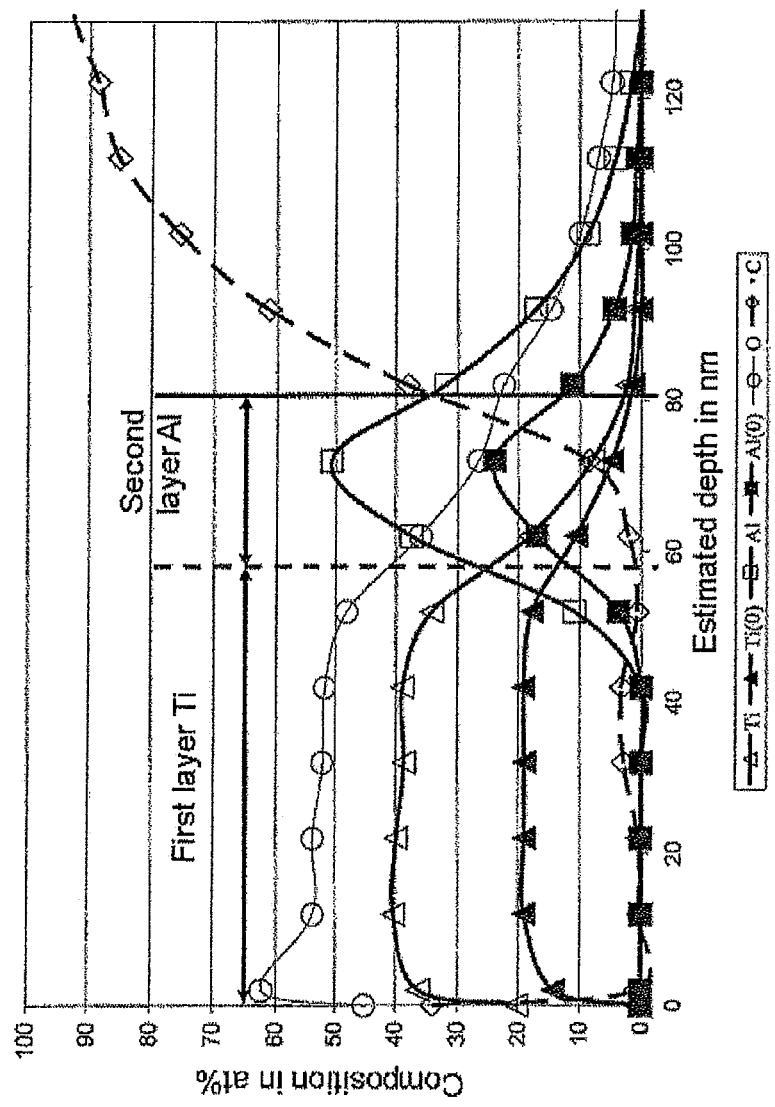

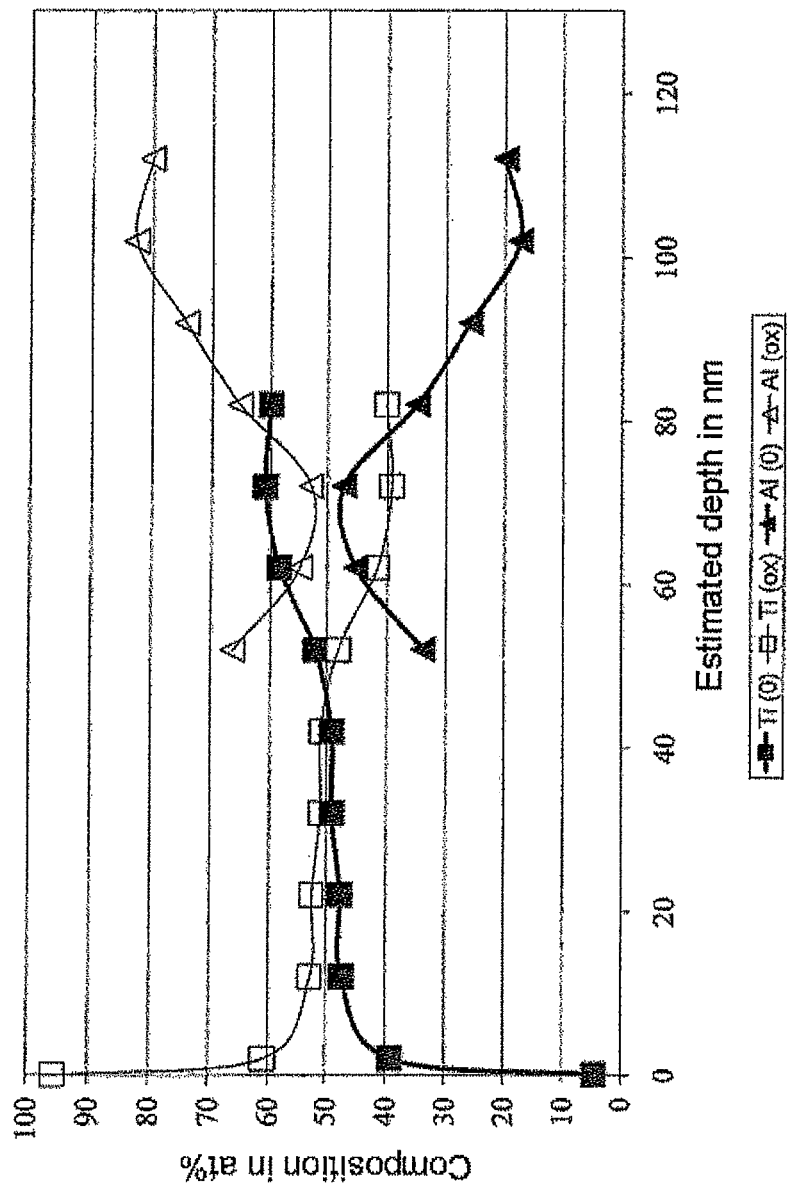

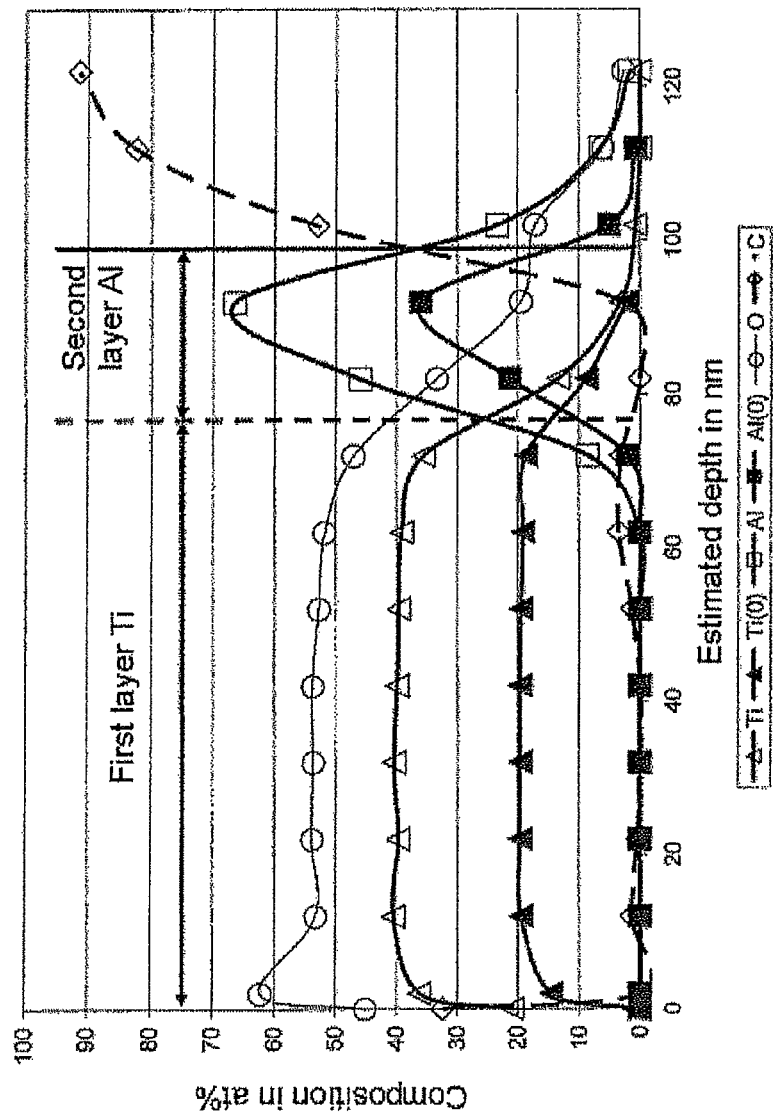

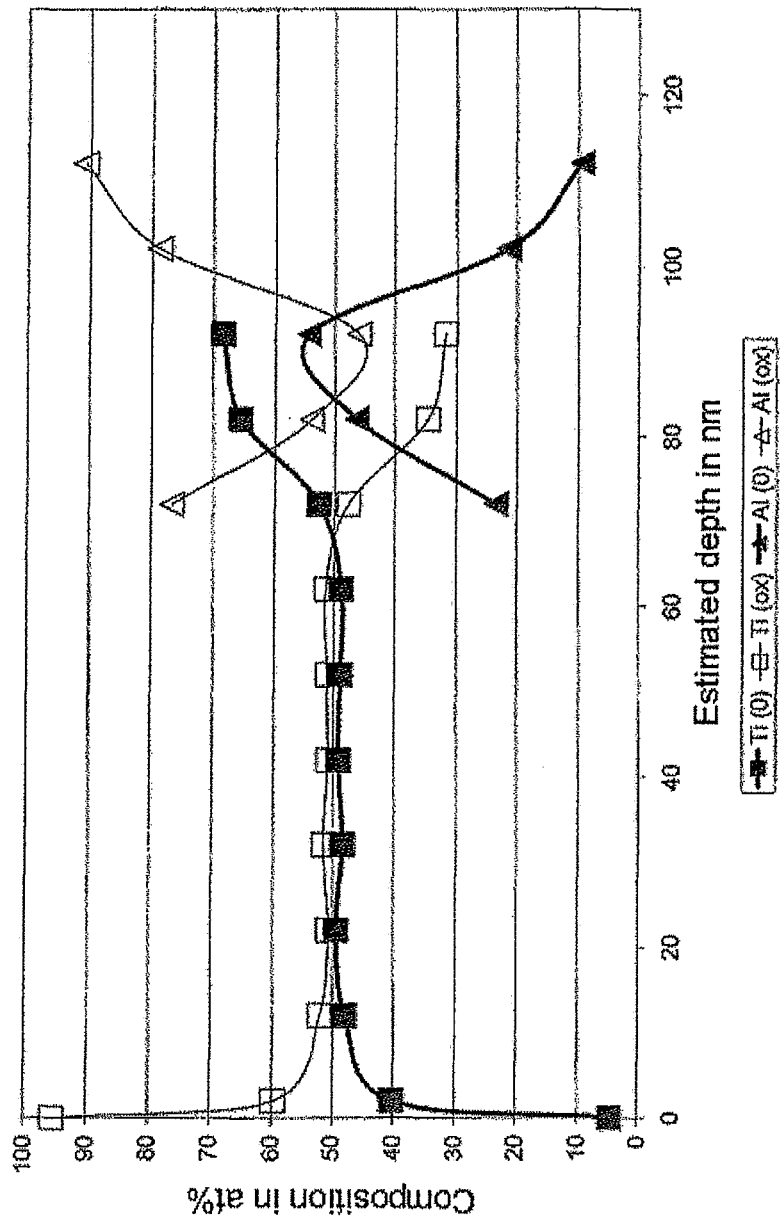
Figure 12b: Comparison of oxidized titanium with metallic titanium and of oxidized aluminum with oxidized aluminum of comparative example 4

PVD-METALLIC EFFECT PIGMENTS WITH DIFFRACTIVE STRUCTURE AND METAL NANOPARTICLES, PROCESS FOR PREPARING THEM AND USE THEREOF

CROSS-REFERENCE TO RELATED APPLICATIONS

The present application is a national phase of PCT/EP2011/062544 filed Jul. 21, 2011 and claims priority to German Patent Application No. 10 2010 032 399.3, filed Jul. 27, 2010, the entire disclosures of which are herein incorporated by reference.

BACKGROUND OF THE INVENTION

1. Field of the Invention

The invention relates to a dark metallic effect pigment which has diffractive structures, to a process for preparing these pigments, and to their use.

2. Description of Related Art

Metallic effect pigments have been used for many years in coatings in order to generate a metallic effect.

Conventional metallic effect pigments consist of platelet-shaped metallic pigments whose effect derives from the directed reflection of incident light at the metallic pigments of lamellar form which are oriented in parallel in the respective application medium.

Typical fields of application of the metallic effect pigments are the coatings industry, especially the automotive industry, the printing industry, and the plastics industry.

Metallic effect pigments produced by PVD techniques have been known for some considerable time. They are notable for extremely high luster, immense covering power, and unique optical properties. Owing to their low thickness of around 30 to 70 nm and their extremely smooth surfaces, they have a tendency, following application, to conform very closely to the substrate. If the substrate is very smooth, the result is virtually a mirrorlike appearance.

Likewise known are metallic effect pigments, produced by PVD techniques, that have a regular embossed structure. This structure is able to act as an optical lattice, and breaks incident light down into its spectral colors. As a consequence of this, these pigments generate a colorfully shimmering color effect ("rainbow effect") in unison with the typical properties of metallic pigments such as high luster, high brightness, and very good hiding power. Pigments of this kind are disclosed for example in U.S. Pat. No. 5,624,076 and also in U.S. Pat. No. 6,692,830 B2.

Cosmetic applications of such pigments are disclosed in EP 1 694 288 B1. They are in commerce under the trade names Holographic® or Metalure Prismatic®.

The company Flex (Santa Rosa, Calif., USA) offers pigments under the trade name Spectraflair®. The structure and production of these pigments are described in Barbara Parker "Advances in Interference Color", in the conference volume of the Color Cosmetic Summit, Montreal (2003). These pigments are multilayer metallic effect pigments generated by PVD techniques, having a central core of aluminum with layers of $MgF_2$ applied to it. Embossed onto these layers of low refractive index is a lattice with a defined spacing of the lattice structures. These pigments generate extremely strong rainbow effects.

In order to generate a dark metallic effect and at the same time a rainbow effect, the known metallic effect pigments with rainbow effect can be tinted with commercially available black pigments. A disadvantage, however, is that such formulations always have a disadvantageous brown tinge. This occurs particularly at shallow angles of observation and/or incidence.

EP 1 522 606 A1 describes the production of a film comprising black aluminum oxide. Neither metallic effect pigments nor multilayer structures are disclosed therein. The films that are disclosed therein have no significant metallic effect with luster and flop.

U.S. Pat. No. 4,430,366 describes the production of films which comprise a sequence of inherently homogeneous layers of metal and metal oxide. Here, again, there is no mention of metallic effect pigments.

DE 69601432 T2 relates to a method for thermal generation of an image on a substrate, where an oxygen-containing, black aluminum layer is applied in such a way that the layer has an optical transmission of at least 0.3 at a wavelength between 200 and 1100 nm. This document, again, does not relate to the provision of metallic effect pigments.

EP 1 144 711 B1 discloses a method for producing reflective color pigments, in which, to a reflection layer, at least one layer which brings about a color change and comprises a transparent material having a refractive index of greater than 1.8, typically metal oxide, and a light-absorbing metal is applied with simultaneous evaporation, the light-absorbing metal being different to the metal of the metal oxide. In terms of process engineering, the method is very hard to control.

DE 10 2007 007 908 A1 discloses dark metallic effect pigments which are produced by PVD techniques. They have a largely homogeneous composition and possess a relatively high oxygen content of 25 to 58 atom %. The layer is dark because the metal is in the form of small metal nanoparticles in dispersion in metal oxide. Metal effect pigments of this kind produce dark and yet highly lustrous metallic effect pigments with a pronounced light/dark flop. The pigments, however, do not exhibit any rainbow effect.

WO 2009/012995 A1 discloses three-layer metallic effect pigments which are likewise able to produce very dark metallic effect pigments. Here again, however, there is no rainbow effect.

It is an object of the present invention to provide a dark and/or colored metallic effect pigment featuring metallic luster and a rainbow effect. In applications pigmented with these pigments, they are not to exhibit any brown tinge, particularly at shallow angles of incidence and/or observation. With particular advantage, instead, a blue tinge is to be visible.

SUMMARY OF THE INVENTION

In some non-limiting embodiments, the present invention provides a metallic effect pigment comprising at least one diffractive structure and at least one layer which comprises metal nanoparticles and metal oxide phase, the metal of the metal oxide phase and the metal of the metal nanoparticles being identical in this at least one layer.

Also provided are articles, coated articles, and coating compositions comprising the metallic effect pigment of the present invention.

Also provided are processes for preparing a metallic effect pigment comprising:

(a1) applying a release layer to a linearly movable substrate, (a2) introducing a diffractive structure into the release layer, preferably by embossing, and (a3) in at least one metal to the release layer on the linearly movable substrate, in a vacuum chamber having a vapor-deposition section, by means of reactive physical vapor deposition (PVD), in the presence of oxygen, or (b1) applying a release layer to a linearly movable substrate, (b2) applying at least one metal to the release layer on the linearly movable substrate, in a vacuum chamber having a vapor-deposition section, by means of reactive physical vapor deposition (PVD), in the presence of oxygen, and (b3) introducing a diffractive structure onto and/or into at least one surface of the PVD layer applied in step (b2), preferably by embossing, and also c) detaching the applied PVD layer(s) provided with a diffractive structure, d) comminuting the detached PVD layer(s), e) optionally transferring the comminuted PVD layer(s) into a dispersion or paste.

BRIEF DESCRIPTION OF THE DRAWINGS

The foregoing summary, as well as the following detailed description, will be better understood when read in conjunction with the appended drawings. In the drawings:

FIG. 1 shows the schematic construction of a metallic effect pigment of the present invention with an embossed surface, with metal nanoparticles present in an oxidic matrix;

FIG. 11a shows the concentration distribution, determined by means of XPS/ESCA sputter profiles for the elements oxygen (O), elemental metal (Al(0) or Ti(0), respectively), and carbon (C) for the pigment of inventive Example 4;

FIG. 11b shows the ratio of elemental metal to oxidized metal in atom % over the layer thickness for the pigment of inventive Example 4 corresponding to Figure 11a, but without the oxygen fraction;

FIG. 12a shows the concentration distribution, determined by means of XPS/ESCA sputter profiles, for the elements oxygen (O), elemental metal (Al(0) or Ti(0), respectively), and carbon (C) for the pigment of Comparative Example 4;

FIG. 12b shows the ratio of elemental metal to oxidized metal in atom % over the layer thickness for the pigment of Comparative Example 4 corresponding to FIG. 11b, but without the oxygen fraction;

DETAILED DESCRIPTION

Figure 2:
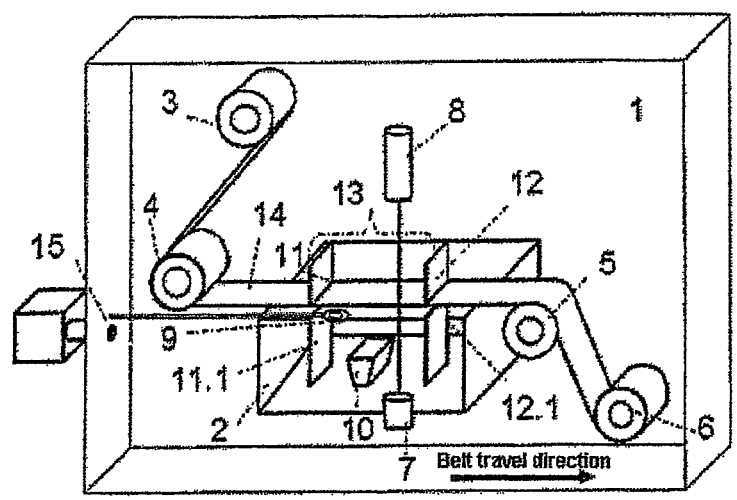
FIG. 2 is a schematic illustration of a PVD apparatus in a vacuum chamber, according to the present invention.

An object of the invention additionally is to prepare highly lustrous effect pigments with a metallic effect and with different base shades in conjunction with a rainbow effect.

An object of the invention in particular is to provide gold-colored effect pigments with a metallic effect and with a rainbow effect.

The effect pigments of the invention are to be able to be provided by means of simple preparation processes.

The object on which the invention is based is achieved through provision of a metallic effect pigment, the metallic effect pigment having at least one diffractive structure and at least one layer which comprises metal nanoparticles and metal oxide phase, the metal of the metal oxide phase and the metal of the metal nanoparticles being identical in this at least one layer.

Preferred embodiments are specified in dependent claims 2 to 21.

The object of the invention is further achieved through provision of a coating composition which comprises the metallic effect pigments of any of claims 1 to 21.

The object is also achieved by provision of a coated article provided with metal effect pigment of any of claims 1 to 21 or with a coating composition of the invention.

According to one preferred variant of the invention, the coating composition is selected from the group consisting of coatings, paints, automotive paints, powder coatings, printing inks, digital-printing inks, plastics, and cosmetic formulations.

Lastly, the object of the invention is also achieved through provision of a process for preparing the metallic effect pigments of any of claims 1 to 21, the process comprising the following steps:

(a1) applying a release layer to a linearly movable substrate,
(a2) introducing a diffractive structure into the release layer, preferably by embossing,
(a3) applying at least one metal to the release layer on the linearly movable substrate, in a vacuum chamber having a vapor-deposition section, by means of reactive physical vapor deposition (PVD), in the presence of oxygen, or (b1) applying a release layer to a linearly movable substrate,
(b2) applying at least one metal to the release layer on the linearly movable substrate, in a vacuum chamber having a vapor-deposition section, by means of reactive physical vapor deposition (PVD), in the presence of oxygen,
(b3) introducing a diffractive structure onto and/or into at least one surface of the PVD layer applied in step (b2), preferably by embossing, and also
c) detaching the applied PVD layer(s) provided with a diffractive structure,
d) comminuting the detached PVD layer(s),
e) optionally transferring the comminuted PVD layer(s) into a dispersion or paste.

In accordance with the invention, the designation "metallic effect pigment" also comprehends "metallic effect pigments".

A "metallic effect pigment" is a laminar metal pigment. The metallic effect pigment of the invention is a metallic effect pigment produced by physical vapor deposition (PVD), and may also be referred to as a PVD metallic effect pigment.

The metal nanoparticles may also be referred to as metal clusters.

In one preferred embodiment of the invention, the metal nanoparticles are present preferably substantially in a metal oxide phase or metal oxide matrix, more preferably completely in a metal oxide phase or metal oxide matrix.

It has surprisingly been found that metallic effect pigments having a well-pronounced optical rainbow effect in conjunction with a very wide variety of base shades can be obtained. For instance, depending on the size of the metal nanoparticles, in the case of aluminum nanoparticles, for example, it is possible to set a dark base shade or a golden base shade. Additionally, via the setting of the layer thickness of the layer comprising metal nanoparticles in a metal oxide matrix, it is possible to obtain a base shade which may be, for example, gold, violet, blue, or black, and/or dark.

The present invention accordingly enables the provision of metallic effect pigments having interesting optical properties. A great advantage is that these metallic effect pigments can be prepared inexpensively. Thus it is possible, for example, to produce gold-colored aluminum effect pigments with rainbow effect. These gold-colored aluminum effect pigments can be used in place of the substantially more expensive brass effect pigments.

The metallic effect pigments of the invention are metallic and produce a metallic effect to a viewer, despite the fact that the metallic effect pigments comprise metal oxide in a significant fraction. This result is very surprising and can probably be attributed to the specific structure of the metallic pigments of the invention—that is, to the arrangement of metal nanoparticles in a metal oxide matrix.

In one preferred embodiment, the at least one layer which comprise metal nanoparticles and metal oxide phase comprises the at least one diffractive structure. According to further preferred embodiments, the diffractive structure is at least partially shaped into the at least one layer which comprises metal nanoparticles and metal oxide phase, and/or this at least one layer is shaped to form a diffractive structure. In one variant of the invention, the metallic effect pigment has the diffractive structure(s) only on the top or bottom surface of the metallic effect pigments.

In one particularly preferred embodiment, the entire layer is shaped to form a diffractive structure. In this way a particularly strong "rainbow effect" is achieved.

The physical principle underlying this rainbow effect is the diffraction of incident light at the diffractive structure(s). Accordingly, the coloring of the metallic effect pigments of the invention differs fundamentally from that of—for example—colored interference effects. In the case of interference structures, a wide variety of different shades are obtained as a result of a suitable sequence of layers of high and low refractive index. There are countless interference pigments known here in the prior art. In the case of what are called multilayer layers, a suitable substrate, such as a platelet-shaped mica, a glass flake, or metallic effect pigments such as an aluminum effect pigment, is populated with at least one layer stack of alternating high-index, low-index, and high-index layers. Effect pigments of this kind may likewise generate color flops, i.e., different colors at different angles of incidence and/or of viewing. Nevertheless, the effects obtained therewith are not comparable with the rainbow effects that can be achieved with diffractive effect pigments.

The diffractive structure(s) has or have preferably a periodic pattern with diffractive elements. The periodic pattern here refers to the smallest unit of the diffractive elements. The periodic diffractive structure preferably has 5000 to 20 000 diffractive elements/cm, more preferably 8000-18 000 diffractive elements/cm, and very preferably 9000-16 000 diffractive elements/cm. Within this range, primarily visible light (about 400 to 800 nm in wavelength) is diffracted in accordance with the known principle of a diffraction lattice, with the viewer perceiving a rainbow effect as a result. It is, however, also possible for fractions of the IR radiation and/or the UV radiation to be diffracted.

The periodicity substantially determines the diffracted wavelengths of the incident light. Specifically, this may be calculated in accordance with known formulae, as can be found in U.S. Pat. No. 6,692,830 B2.

Diffractive elements contemplated include, for example symmetrical triangles, asymmetrical triangles, grooves in a wide variety of different forms, rectangle functions, circles, wavy lines, cones, truncated cones, knobs, prisms, pyramids, truncated pyramids, cylinders, hemispheres, etc., and also combinations of these geometric forms and bodies.

Geometric bodies having one or more surfaces disposed parallel to the pigment surface, such as truncated cones, truncated pyramids, cylinders, or rectangle functions, for example, have a higher reflection capacity on account of these surfaces.

Geometric bodies which, relative to the pigment surface, have inclined side faces intensify the rainbow effect. Inclined side faces are side faces which, based on the substrate, have an angle of 5 to 89°, preferably of 15 to 84°, more preferably of 27 to 80°, more preferably still of 43 to 74°. Examples of suitable geometric bodies include cones, truncated cones, pyramids, truncated pyramids, etc.

In the case of truncated pyramids, there is for example a reflection at the top face parallel to the pigment surface, and an intensification of the rainbow effect at the cylindrical surface. Correspondingly, in the case of truncated pyramids, there is reflection at the top face and an intensification of the rainbow effect at the inclined side faces.

In the case of truncated cones or truncated pyramids it is of course also possible to dispose the top face not parallel to the pigment surface but instead at an incline relative to the pigment surface.

Via the geometric bodies disposed by embossing and/or shaping on the pigment surface it is possible to intensify the rainbow effect and/or the reflection capacity of the metallic effect pigment of the invention, or to change the relative ratio of rainbow effect to reflection.

Accordingly, the geometric bodies may be present separated in sections or else mixed with one another. It is also possible of course, to dispose the geometric forms and geometric bodies with superimposition, so that, for example geometric bodies are disposed additionally on a wavy structure.

According to one further variant of the invention, unembossed or unshaped, and therefore smooth, sections may be present on the metallic effect pigment surface, as well as embossed and/or shaped sections. By this means as well it is possible to change the relative ratio of rainbow effect to reflection.

Preferably the entire surface of the metallic effect pigment is provided, preferably by embossing, with the diffractive structure. It is also possible, however, for only part of the metallic effect pigment surface to be provided, preferably by embossing, with the diffractive structure, and/or to be shaped to form a diffractive structure. It is preferred for at least 60%, more preferably at least 75%, and very preferably at least 90% of the metallic effect pigment surface to be embossed with a diffractive structure or shaped to form a diffractive structure.

In one particularly preferred embodiment, the diffractive structure comprises or consists of wavy—for example, sinusoidal—lines, cones, or truncated cones. In an especially preferred embodiment, the diffractive structure comprises or consists of sinusoidal lines, since first this form is particularly easy to emboss and secondly it produces a very strong diffraction effect. In the case of these sinusoidal lines, the diffractive structure is preferably embossed on the whole metallic effect pigment.

In order to be able to obtain a distinctly perceptible effect, the diffractive structure preferably has a certain minimum depth, since otherwise it is not possible adequately to develop the physical effect of diffraction. The diffractive structure ought therefore preferably to have a depth (measured as "peak to valley") of at least 40 nm, preferably 40 nm to 600 nm, and more preferably of 50 nm to 400 nm, and very preferably of 100 nm to 250 nm. Above 600 nm, the structure as a whole may no longer have stability.

It is preferred for the average layer thickness of the at least one layer which comprises metal nanoparticles and metal oxide phase to be in a range from 8 to 500 nm. According to a further preferred embodiment a range from 12 to 200 nm, more preferably from 15 to 130 nm.

The depth of the diffractive structure may therefore exceed the average layer thickness of the at least one layer which comprises metal nanoparticles and metal oxide phase. This is preferably the case especially when the entire at least one layer is shaped to form a diffractive structure.

According to one preferred development of the invention, the metal of the at least one layer which comprises metal nanoparticles and metal oxide phase is selected from the group consisting of aluminum, magnesium, chromium, silver, copper, gold, zinc, tin, manganese, iron, cobalt, nickel, titanium, tantalum, molybdenum, tungsten, mixtures thereof, and alloys thereof. With particular preference the metal of the at least one layer which comprises metal nanoparticles and metal oxide phase is selected from the group consisting of aluminum, chromium, and titanium, mixtures thereof, and alloys thereof.

According to one preferred development of the invention, the average size of the metal nanoparticles is in a range from 1 to 50 nm. Very suitable size ranges have also been found to be average diameters from a range from 1.5 to 30 nm, more preferably from 2 to 13 nm.

The base shade of the metallic effect pigments of the invention is established preferably by the average size of the metal nanoparticles. Accordingly, the coloring of the metallic effect pigments differs generally in dependence on the average size of the metal nanoparticles.

A small average size of metal nanoparticle refers more particularly to those particles which are in a size range from 1 to 10 nm, more particularly from 2 up to 8 nm. The average size of the metal nanoparticles is typically at least 4 nm.

A large average size of metal nanoparticle refers more particularly to those particles which are in a size range of more than 10 nm, more particularly of up to 50 nm. In the case of one very suitable variant of the invention, the average size of the large metal nanoparticles is in a range from 15 to 30 nm.

The coloring and/or the intensity of color may also be dependent on the thickness of the layer comprising metal nanoparticles and metal oxide phase.

The at least one layer comprising metal nanoparticles in a metal oxide matrix, or two or more layers each of which may comprise metal nanoparticles in a metal oxide matrix, give a dark to black visual impression according to layer thickness and size of the metal nanoparticles.

It is thought that the metal nanoparticles present in or embedded in the oxide matrix are in electronic interaction. The metal nanoparticles exhibit extremely strong absorption of electromagnetic radiation. In contrast to a pure metal ("bulk" metal), the metal atoms are not connected electronically to one another to such an extent that the typical metallic reflection occurs. The overall effect is therefore one of a dark color.

The size of the metal nanoparticles can be determined by means of TEM analysis. In this case the sample is preferably prepared as elucidated later on below, and the micrographs—in which the metal nanoparticles appear dark on account of their high scattering cross section for the electrons—are analyzed. For determination of the average size, at least 70 particles are counted and the arithmetic mean is formed. The average size of the metal nanoparticles is preferably in a range from 1 to 50 nm, more preferably 1.5 to 30 nm, and very preferably 2 to 10 nm.

For determining the layer thicknesses, the metal, and the amounts of metal nanoparticle and of metal oxide, it is possible, generally, to use the methods indicated in the examples, such as ESCA (chemical analysis with photoelectron spectroscopy).

The inventors have found that, surprisingly, it is possible to influence or modify the base color of the metallic effect pigments by way of the size of the metal nanoparticles present in the metal oxide phase.

For example, in the case of aluminum, gold-colored aluminum effect pigments are obtained if the aluminum nanoparticles present in aluminum oxide have an average size in a size range from 15 to 28 nm, preferably from 18 to 25 nm, more preferably at about 20 nm.

Where, in contrast, the aluminum nanoparticles which are present in the aluminum oxide have an average size which is within a range from 2 to 13 nm, more preferably from 5 to 12 nm, more preferably still at about 10 nm, aluminum effect pigments are obtained which have a dark or black base shade.

The metallic effect pigments of the invention with dark or black base shade can also be mixed with further effect pigments, as for example unembossed metallic effect pigments and/or pearlescent pigments. In this case a pigment mixture is obtained which following application of a paint pigmented with this pigment mixture, or an ink, produces a coating having a hidden rainbow effect. The rainbow effect is then perceptible substantially only in direct sunlight or in another strong white light source. A pigment mixture of this kind or a correspondingly pigmented paint or an ink are suitable more particularly for use as a security feature.

Accordingly, via the adjustment of the average size of the metal nanoparticles, the present invention, in a surprisingly simple way, allows the generation of a wide variety of different base shades, which are perceived together with a rainbow effect and allow extremely interesting color design.

The color impression given by the metallic effect pigments can additionally be modified as well via the set thickness of the layer in which the metal nanoparticles are present in the metal oxide phase.

In accordance with a further preferred embodiment, the average amount of metal nanoparticles in the at least one layer comprising metal nanoparticles and metal oxide phase is in a range from 1 to 50 atom %, more preferably from 3 to 40 atom %, very preferably from 4 to 35 atom %, and especially preferably from 5 to 20 atom %, based in each case on the total amount of metal and oxygen in said layer.

In the case of a layer thickness from a range from 50 to 80 nm, preferably from 55 to 75 nm, and preferably comprising Al and/or Cr as metal, and with an oxygen content from a range from 55 atom % to 70 atom %, metal nanoparticles are present in finely divided form. Metallic effect pigments having this composition are of transparent gold color.

If the layer thickness is increased further, the resulting metallic effect pigments are initially red, then violet, and finally blue and transparent.

In this way, gold-colored, transparent, prismatic Al pigments which in particular are free from heavy metal can be described.

Transparent prismatic Cr pigments are notable for corrosion resistance and high color intensity.

According to one variant of the invention, the amount of metal nanoparticles over the thickness of the at least one layer comprising metal nanoparticles and metal oxide phase is largely homogeneous, preferably homogeneous. By "homogeneous" is meant in this context that, over the thickness of the layer in which the metal nanoparticles are present in the metal oxide, there is largely no gradient in terms of the concentration of the metal nanoparticles. The metal nanoparticles are therefore distributed uniformly over the thickness of the layer. The concentrations of elemental metal that are determined by means of ESCA and sputter profiles are the criterion here for the presence of a largely homogeneous concentration of the metal nanoparticles along the at least one layer.

According to a further variant of the invention, the at least one layer which comprises metal nanoparticles and metal oxide phase has a first outer face and a second outer face, the amount of metal nanoparticles in the first outer face and in the second outer face of this layer being different from one another and differing by at least 10 atom %.

An outer face for the purposes of the invention means a depth of approximately 10 nm. This depth corresponds to the usual signal depth in the ESCA method that can be used to determine the concentration of the metal oxide and/or of the metal nanoparticles.

In accordance with the invention it is therefore possible to provide asymmetrical metallic effect pigments. If the metal effect pigments of the invention are in single-layer form, the outer faces in that layer are also the outer faces of the metallic effect pigment. The base color of the metallic effect pigments may also vary in dependence on the concentration of the metal nanoparticles in the metal oxide phase. Since the orientation of the metallic effect pigments, in a paint or in a printing ink, for example, varies statistically in relation to the position of the outer face, it is therefore possible, with one metallic effect pigment, to generate mixtures of shades which at the same time exhibit a rainbow effect. This allows interesting colorations. Moreover, these asymmetrically constructed pigments can be produced in a more easily reproducible way.

It is further preferred for the metallic effect pigment to have two layers arranged one atop the other, with at least one layer comprising metal nanoparticles in a metal oxide phase, and for this at least one layer to have a first outer face and a second outer face, and for the amount of metal nanoparticles in the first outer face and in the second outer face of this at least one layer to be different from one another and to differ by at least 10 atom %.

In the case of this variant of the invention, the at least one layer comprising metal nanoparticles and metal oxide phase or metal oxide matrix may have been applied to a metallic layer. The metallic layer in this case preferably has a layer thickness of at least 2 nm, preferably at least 5 nm. A layer thickness in a range from 5 to 30 nm, preferably from 7 to 25 nm, has proven very suitable. In this layer-thickness range, the metal layer has strongly absorbing properties, and so the metallic effect pigments overall produce a darker or more restrained impression of color.

The metal layer can of course also have a greater thickness, as for example in a range from 30 to 250 nm, preferably from 35 to 180 nm. A range from 38 to 74 nm as well has proven very suitable. In the case of these greater layer thicknesses, the metal layer is strongly reflecting and lustrous.

The color impression of these two-layer metallic effect pigments can be adjusted via the layer thickness and/or the average size of the metal nanoparticles in the metal oxide phase or metal oxide matrix. As the layer thickness increases, the perceived color goes from gold through red and on to blue. These base shades are possessed by the metallic effect pigments of the invention in addition to the rainbow effect.

With a constant ratio of oxygen to metal, for example, and hence on application of a layer having a constant size of metal nanoparticles in a metal oxide matrix to a metal layer, the aforementioned base shades can be produced.

Thus, for example, chromium effect pigments having a two-layer structure, comprising an aluminum metal layer and a layer with chromium nanoparticles embedded in chromium oxide, where the oxygen fraction, based on the total amount of oxygen and chromium in this layer, is in a range from 30 to 58 atom %, have the following base shade depending on the layer thickness:

Example A:
Aluminum layer thickness: 15 nm
Thickness of the layer with chromium nanoparticle in chromium oxide: 15 nm
Base shade: gold Example B:
Aluminum layer thickness: 15 nm
Thickness of the layer with chromium nanoparticle in chromium oxide: 20 to 30 nm
Base shade: red Example C:
Aluminum layer thickness: 15 nm
Thickness of the layer with chromium nanoparticle in chromium oxide: 40 to 60 nm
Base shade: blue According to a further variant of the invention, the platelet-shaped metallic effect pigment has three or more layers disposed one atop another, with at least one layer comprising metal nanoparticles in a metal oxide phase, which comprises at least one layer having a first and a second outer face, the metallic effect pigment has a first outer face and a second outer face, and the highest amount of metal nanoparticles is present in the first or in the second outer face of the metallic effect pigment, and the amount of metal nanoparticles in the first and in the second outer face of the at least one layer differs by at least 10 atom %.

In accordance with the invention it is also preferred for the amount of metal nanoparticles, in at least one layer which comprises metal nanoparticles and metal oxide phase, to alter continuously over the thickness of that layer.

In at least one layer which comprises metal nanoparticles and metal oxide phase, the amount of metal nanoparticles preferably changes at least partly with a gradient which is in a range from 0.1 to 4 atom %/nm over the thickness of the layer. According to a further-preferred variant, the gradient is in a range from 0.5 to 3 atom %/nm.

According to a further-preferred variant, the amount of metal nanoparticles changes discontinuously between two successive layers. According to one preferred variant of the invention, the difference in the amount of metal nanoparticles is in a range from 10 atom % to 40 atom %, more preferably from 12 atom % to 35 atom %, and more preferably still from 15 atom % to 30 atom %.

In a further preferred variant of the layer of the invention in which metal nanoparticles are present in a metal oxide matrix, the average amount of metal M and oxygen is at least 80 atom %, more preferably at least 90 atom %, based on this one layer. This layer may therefore also contain extraneous elements and/or extraneous atoms. Preferred extraneous elements in this layer are, for example, nitrogen, sulfur, carbon and/or hydrogen. Thus, more particularly, nitrogen (preferably in the form of metal nitrides) may be incorporated into the layer if air is used as the oxygen source when producing the metallic effect pigments of the invention.

The visual impression given by the metallic effect pigments may therefore be influenced by a multiplicity of possible combinations. Thus, for example, the metallic luster of the metallic effect pigments of the invention can be intensified by forming an outer face of the metallic effect pigment by means of a metallic layer. A metallic layer is therefore to be understood as a layer which is formed substantially, preferably completely, from continuous metal, which superficially may also have a naturally occurring metal oxide layer. In this layer of continuous metal there are therefore no metal nanoparticles present in a metal oxide matrix.

According to a further variant of the invention, the metallic effect pigment has at least one first and one second successive layer, the first layer comprising metal nanoparticles and the second layer comprising elemental metal, the amount of metallic nanoparticles in the outer face of the first layer, which comprises metal nanoparticles and metal oxide phase, being in a range from 1 to 50 atom %, and the amount of elemental metal in the outer face of the second layer being in a range from 60 to 95 atom %, with the proviso that the difference in the amount of metal nanoparticles and of elemental metal in the two outer faces is at least 10 atom %.

With this variant, the metallic effect pigments of the invention have a metal layer which is able to act as a reflector. It is of course also possible to dispose the metal layer centrally, so that at least one layer comprising metal nanoparticles in a metal oxide layer is disposed respectively on the top face and on the bottom face of the metal layer.

The average amount of metal in the metal layer, based on the total amount of metal and oxygen in this at least one layer, is in a range from 60 to 95 atom %. With further preference the average amount of metal and oxygen in the at least one layer is at least 90 atom %, preferably at least 95 atom %, and more preferably at least 97 atom %, based in each case on this one layer. In this metal layer there are therefore no metal nanoparticles present. Instead, this metal layer is a conventional metal layer, which may also comprise metal oxide.

In the case of the above variant of the invention, the metal is preferably a trivalent metal and more preferably the metal is selected from the group consisting of aluminum, chromium, and mixtures and alloys thereof.

In another variant it is preferred for the metal to be a tetravalent metal and with particular preference to be selected from the group consisting of titanium, tin, and mixtures and alloys thereof. In this case the metallic effect pigment has at least one first and one second successive layer, the first layer comprising metal nanoparticles and the second layer comprising elemental metal, and the amount of metal nanoparticles in the outer face of the first layer, which comprises metal nanoparticles and metal oxide phase, being in a range from 1 to 50 atom %, and the amount of elemental metal in the outer face of the second layer being in a range from 60 to 95 atom %, with the proviso that the difference in the amount of metal nanoparticles and of elemental metal in the two outer faces is at least 10 atom %.

With this variant of the metallic effect pigments of the invention as well, the metal layer may act as a reflector. It is of course possible here as well for the metal layer to be arranged centrally, so that at least one layer comprising metal nanoparticles in a metal oxide layer is disposed respectively on the top face and on the bottom face of the metal layer.

In accordance with one preferred development of the invention, the at least one layer which comprises metal nanoparticles and metal oxide phase has an average oxygen content of 15 to 77 atom %, based on the total amount of metal and oxygen in this layer.

In the case of further-preferred embodiments, the layer has an average oxygen content of 30 to 57 atom %, more preferably of 35 to 53 atom %.

According to a preferred embodiment of the invention, the oxygen content in the case of monovalent metals is in a range from 15 to 30, preferably from 20 to 28 atom %.

According to one preferred embodiment of the invention, the oxygen content in the case of divalent metals is in a range from 28 to 48, preferably from 33 to 43 atom %.

According to one preferred embodiment of the invention, the oxygen content in the case of trivalent metals is in a range from 30 to 58, preferably from 35 to 53 atom %.

According to one preferred embodiment of the invention, the oxygen content in the case of tetravalent metals is in a range from 40 to 64, preferably from 45 to 59 atom %.

The oxygen present in this layer is in the form of metal oxide. This metal oxide forms a matrix into which the metal nanoparticles have been incorporated. The metal oxide matrix produces a number of advantages. First, it protects the oxidation-sensitive metal nanoparticles, entirely surprisingly, against oxidation, very effectively. This is a very surprising effect for the reason in particular that metallic nanoparticles are known to be significantly more base and hence more susceptible to corrosion than their macroscopic embodiments.

Secondly, the metal oxide matrix endows the layer with mechanical properties which are barely distinguishable from the properties of corresponding conventional metal oxides. The layers of the invention are therefore likewise mechanically brittle, which has the great advantage that the metallic pigments of the invention can be comminuted mechanically with great ease. This leads to metallic effect pigments whose fracture edges have a pronounced smoothness, and this in turn is very conducive to the optical properties (flop, luster).

The at least one layer in this case consists essentially of metal and oxygen. The metal here is present on the one hand as elemental metal, in the form of metal nanoparticles, and on the other hand as metal oxide. The metal, and therefore the metal nanoparticles and/or the metal in the metal oxide matrix, may also in each case be a mixture of different metals, with the mixture of different metals in the metal nanoparticles and in the metal oxide matrix being identical.

On account of the specific structure of the layer of metal nanoparticles and metal oxide matrix, the layer of the invention differs, significantly from purely stoichiometric or else nonstoichiometric metal oxide layers. In optical terms, the layer of the invention produces a metallic appearance with a high light/dark flop. Depending on the size and/or on the concentration of the metal nanoparticles and/or on the layer thickness, it is also possible at the same time for a dark to black coloration to occur. Effect pigments based on this layer are therefore perceived optically as metallic effect pigments. In terms of their mechanical properties, however, the metallic effect pigments of the invention equate more to typical pearlescent pigments based on metal oxides.

In accordance with the invention, in the case of a further variant of the invention, it is preferred for the metallic effect pigment to comprise at least three layers:

A) a layer A which has at least one metal $M_A$ and an average oxygen content $O_A$, based on the total amount of $M_A$ and $O_A$ in the layer A, B) a layer B with at least one metal $M_B$ and an average oxygen content $O_B$ of 0 to 77 atom %, based on the total amount of $M_B$ and $O_B$ in the layer B, C) a layer C which has at least one metal $M_C$ and an average oxygen content $O_C$, based on the total amount of $M_C$ and $O_C$ in the layer C, the average oxygen content $O_{AC}$ in the layers A and C being determined in accordance with the formula (I)

$$O_{AC} = \frac{1}{2}\left(\frac{O_A}{M_A + O_A} + \frac{O_C}{M_C + O_C}\right) \quad (I)$$

and being in a range from 8 to 77 atom %,
with the proviso that at least one of the layers, A, B, or C, comprises metal nanoparticles.

According to a further variant of this embodiment, the average amount of oxygen $O_{AC}$ in the layers A and C is in a range from 10 to 74 atom %, more preferably from 15 to 70 atom %, more preferably still in a range from 20 to 64 atom %. The amounts are based in each case on the total amount of $M_A$, $O_A$, $M_C$, and $O_C$ in the layers A and C.

According to a further preferred embodiment, the average amount of oxygen $O_A$, based on the total amount of $M_A$ and $O_A$ in the layer A, and the average amount of oxygen. $O_C$, based on the total amount of $M_C$ and $O_C$ in the layer C, are independently of one another each in a range from 25 to 58 atom %, preferably from 30 to 57 atom %.

In the case of monovalent metals, the average amount of oxygen $O_{AC}$ in the layers A and C is preferably in a range from 8 to 30 atom %. In the case of divalent metals the amount of oxygen $O_{AC}$ is preferably in a range from 25 to 48 atom %. In the case of trivalent metals the amount of oxygen $O_{AC}$ is preferably in a range from 30 to 58 atom %. In the case of tetravalent metals the amount of oxygen $O_{AC}$ is preferably in a range from 35 to 64 atom %.

According to yet a further variant of the invention, the total amount of $M_A$ and of $O_A$ in the layer A of the metallic effect pigment is 80 to 100 atom %, based on all of the components in the layer A.

According to yet a further variant of the invention, the total amount of $M_C$ and of $O_C$ in the layer A of the metallic effect pigment is 80 to 100 atom %, based on all of the components in the layer C.

According to yet a further variant of the invention, in the layer A and the layer C of the metallic effect pigment, the total amount of $M_A$ and of $O_A$ is 80 to 100 atom % and the total amount of $M_C$ and $O_C$ is 80 to 100 atom %, based in each case on all of the components in the layer A and C, respectively.

According to one extremely preferred embodiment of the invention, in the above-described variants of a metallic effect pigment comprising at least three layers, the metal is selected from the group consisting of aluminum, chromium, and mixtures and alloys thereof.

In one preferred use of aluminum as metal, it is possible to provide metallic effect pigments which have, for example, a gold-colored base shade in addition to the rainbow effect.

The metallic effect pigments of the invention can be used for example in cosmetics. Cosmetics are subject to very stringent provisions with regard to allowable ingredients. Heavy metals must not be used in the production of cosmetics. Accordingly, the provision of heavy-metal-free metallic effect pigments with rainbow effect and an adjustable base shade is a great advantage in the cosmetics industry, for example, but also in the paint, ink, or plastics industries.

According to a further variant of the invention, the metal effect pigment is enveloped with an anticorrosion layer which is optionally surface-modified.

The metallic effect pigments of the invention may be provided with a protective layer, preferably an enveloping protective layer, against corrosion. This protective layer may comprise or consist of metal oxide and/or plastic.

According to one preferred embodiment of the invention, the metal oxide layer has been applied using sol-gel methods. The metal oxide is preferably silicon oxide, aluminum oxide, cerium oxide, or mixtures thereof.

In a further variant of the invention, the metallic effect pigments of the invention have been provided with a plastics layer. The layer in question is preferably a polyacrylate and/or polymethacrylate layer.

It is of course also possible for mixed layers of metal oxide and plastic to be applied. Also possible is a sequential arrangement, in which the layer or layers of plastic and the layer or layers of metal oxide are disposed in succession.

According to one preferred variant of the invention a silicon oxide layer, preferably $SiO_2$ layer, is used as anticorrosion layer. The silicon oxide layer has been applied preferably by means of sol-gel methods, in which case preferably tetraalkoxysilanes, in the case of a first variant under acidic or basic conditions in a one-stage process, or, in the case of a second variant, initially under acidic and then under basic conditions, in a two-stage process, or in the case of a third variant, initially under basic conditions and then under acidic conditions, in a two-stage process, are hydrolyzed, and silicon oxide, preferably $SiO_2$, is deposited on the metallic effect pigment of the invention. The tetraalkoxysilanes are preferably tetramethoxysilane, tetraethoxysilane and/or tetraproppxysilane.

It is of course also possible for the metal oxide layer to have been applied by hydrolysis of metal salts, such as metal halides, for example, preferably metal chlorides.

According to another preferred embodiment, the metal oxide layer, preferably silicon oxide layer, is organochemically modified. This organochemical surface modification may involve hydrophobizing agents, such as alkylsilanes, for example. It is also possible, however, for reactive surface modifiers to have been disposed that have reactive functional organic groups. These reactive functional organic groups may be acrylic, methacrylic, vinyl, epoxide, hydroxyl, amino, mercapto groups, etc. Via these reactive functional groups there is a possibility of chemical attachment—for example, to the binder or binders of an ink, printing-ink, paint, or plastic. As a result of the chemical attachment, the metallic effect pigments are incorporated more effectively, and so the corrosion resistance of the metallic effect pigments and/or the condensation resistance of a paint are significantly enhanced.

The metallic effect pigments of the invention are obtained using physical vapor deposition (PVD).

This process encompasses the following steps:
(a1) applying a release layer to a linearly movable substrate,
(a2) introducing a diffractive structure into the release layer, preferably by embossing,
(a3) applying at least one metal to the release layer on the linearly movable substrate, in a vacuum chamber having a vapor-deposition section, by means of reactive physical vapor deposition (PVD), in the presence of oxygen,
or
(b1) applying a release layer to a linearly movable substrate,
(b2) applying at least one metal to the release layer on the linearly movable substrate, in a vacuum chamber having a vapor-deposition section, by means of reactive physical vapor deposition (PVD), in the presence of oxygen,
(b3) introducing a diffractive structure onto and/or into at least one surface of the PVD layer applied in step (b2), preferably by embossing,
and also
c) detaching the applied PVD layer(s) provided with a diffractive structure,
d) comminuting the detached PVD layer(s),
e) optionally transferring the comminuted PVD layer(s) into a dispersion or paste.

"Reactive physical vapor deposition" refers, in accordance with the invention, to the deposition of metal vapor in the presence of oxygen, as for example pure oxygen or air, or an oxygen-donating source, as for example water. In the course of this reactive physical vapor deposition (PVD), metal oxide and metal, in the form for example of metal nanoparticles, are deposited.

The reactive physical vapor deposition is carried out preferably under a pressure in a range from $1 \times 10^{-5}$ to $1 \times 10^{-2}$ mbar, preferably from $1 \times 10^{-4}$ to $1 \times 10^{-3}$ mbar. In order to bring about effective conversion of metal vapor and oxygen, the oxygen is supplied under a lower pressure preferably closer to the metal vapor source than at a higher pressure.

For the production of the metallic effect pigments of the invention there are two possible approaches, which differ in terms of the formation of the diffractive structure.

In the case of the first approach, the release layer, also referred to as "release coat", which is applied to the linearly movable substrate, typically a polymeric film, as for example a polyester film, is provided with a diffractive structure and then the metal is vapor-coated on.

In the case of the second approach, a release layer is applied to the linearly movable substrate, typically a polymeric film, as for example a polyester film, and the metal is then vapor-coated onto said release layer. After the film of metal has been applied, the diffractive structure is then introduced into the film of metal.

The diffractive structure may be introduced for example by embossing into the release layer or into the applied film of metal. Embossing may take place, for example, using an embossing die or an embossing roll. In this case, a negative impression of the embossing die or of the embossing roll is introduced into the release layer or into the applied metal layer.

In terms of the embossing patterns, reference is made to the above observations concerning the embossed or shaped metallic effect pigments. The observations apply correspondingly.

Vapor deposition with metal may take place in a conventional way, as for example by means of electron beam technology, sputtering, or resistance-heated and/or radiation-heated methods. It is possible here for two or more evaporators to be disposed in series and/or in parallel with one another.

The thickness of the metal layers can be checked by means of transmission measurements. Owing to the partially oxidic nature of the film layer, the transmissions are usually lower than for the evaporation of pure metals.

When generating colored oxide layers, which are applied to a reflective metal layer, for example, it is also possible to employ reflection measurements for the purpose of controlling or regulating the evaporation procedure.

The oxygen or oxygen donor that is supplied during the vapor deposition step can be introduced by means of a multiplicity of possible procedural variants into the vacuum chamber that is used for the vapor deposition. In general the oxygen is regulated using mass flow controllers and is metered into the vacuum chamber in the desired positioning.

The oxygen source, for example oxygen or the oxygen donor, for example water or water vapor, can be introduced into the vacuum chamber directly and centrally, or diffusely and with homogeneous distribution in the metal vapor, or at a distance from the metal vapor source.

By central disposition of metal vapor source and oxygen source, or by diffuse addition of the oxygen source, it is possible to produce a layer featuring homogeneously distributed metal nanoparticles in a metal oxide matrix.

Diffuse addition means an addition where the oxygen source is introduced into the vacuum chamber in such a way that in the vacuum chamber no gradient is produced in terms of the oxygen source, and therefore the distribution of the oxygen source in the vacuum chamber is homogeneous.

Both with a central disposition of metal vapor and oxygen supply and with diffuse addition of the oxygen source, a homogeneous distribution of the metal nanoparticles in the metal oxide phase or metal oxide layer is produced.

If the metal vapor source is at a spatial distance from the oxygen source in relation to the direction of movement of the substrate to be vapor-coated, there is a superimposition of a metal vapor with a radially falling metal vapor concentration, and there is an oxygen source, oxygen gas for example, with radially decreasing concentration and for the purpose of generating a layer on the substrate having a metal nanoparticle gradient in a metal oxide matrix.

In the case of decentralized arrangement of the oxygen supply in relation to the metal vapor source, therefore, a gradient of metal nanoparticles in a metal oxide phase or metal oxide matrix is produced. If the oxygen supply is arranged before the metal vapor source in relation to the direction of movement of the linearly moved substrate, a belt for example, then more metal oxide and fewer metal nanoparticles are deposited at the beginning. Subsequently, in the direction of movement of the substrate, there is an increase in the fraction of metal nanoparticles and a decrease in the fraction of metal oxide.

If the oxygen supply, relative to the direction of movement of the substrate, is arranged after the metal vapor source, then initially more metal nanoparticles and less metal oxide are deposited. Subsequently, in the direction of movement of the substrate, there is a decrease in the fraction of metal nanoparticles and an increase in the fraction of metal oxide. Through the disposition of the metal vapor source at a distance from the oxygen supply or oxygen source, therefore, it is possible to generate a gradient of metal nanoparticles in a metal oxide phase or metal oxide matrix.

Depending on the distance of the oxygen supply disposition relative to the metal vapor source, the metal oxide content can also go down to zero, meaning that a pure metal layer is applied as one of the two outer faces of the metallic effect pigment. It is therefore possible to apply a two-layer metallic effect pigment of the invention in a single-stage process. The first layer in this case comprises a gradient of metal nanoparticles in a metal oxide layer, with an increase in the relative fraction of metal nanoparticles, a decrease in the relative proportion of metal oxide, and, lastly, a continuous metal layer, which acts as an absorber or reflector depending on the layer thickness, is applied.

The present invention therefore relates to processes by which it is possible to produce metallic effect pigments of the invention in which the at least one layer which comprises metal nanoparticles in a metal oxide phase or metal oxide matrix has a homogeneous construction or a gradient.

According to a further variant, therefore, the present invention relates to a process for providing metallic effect pigments which at least one layer of substantially homogeneous, preferably homogeneous, construction, comprising metal nanoparticles and metal oxide phase or metal oxide matrix, with the following steps:

(a1) applying a release layer to a linearly movable substrate,
(a2) introducing a diffractive structure into the release layer, preferably by embossing,
(a3) vaporizing a linearly moved substrate, in a vacuum chamber having a vaporizing section, by means of reactive physical vapor deposition (PVD), with at least one metal in the presence of oxygen, so that part of the metal reacts with oxygen to form metal oxide, and unreacted metal in the form of metal nanoparticles, and formed metal oxide, are deposited via the vaporizing section in substantially homogeneous, preferably homogeneous, distribution in relation to the direction of movement of the linearly moved substrate, to give a PVD layer or a plurality of PVD layers disposed one atop another,
or
(b1) applying a release layer to a linearly movable substrate,
(b2) vaporizing a linearly moved substrate, in a vacuum chamber having a vaporizing section, by means of reactive physical vapor deposition (PVD), with at least one metal in the presence of oxygen, so that part of the metal reacts with oxygen to form metal oxide, and unreacted metal in the form of metal nanoparticles, and formed metal oxide, are deposited via the vaporizing section in substantially homogeneous, preferably homogeneous, distribution in relation to the direction of movement of the linearly moved substrate, to give a PVD layer or a plurality of PVD layers disposed one atop another,
(b3) introducing a diffractive structure onto and/or into at least one surface of the PVD layer applied in step (b2), preferably by embossing,
and also
(c) detaching the applied PVD layer(s) provided with a diffractive structure,
(d) comminuting the detached PVD layer(s),
(e) optionally transferring the comminuted PVD layer(s) into a dispersion or paste.

According to a further variant, additionally, the present invention relates to a process for providing metallic effect pigments which at least one gradient layer, comprising metal nanoparticles and metal oxide phase or metal oxide matrix, with the following steps:

(a1) applying a release layer to a linearly movable substrate,
(a2) introducing a diffractive structure into the release layer, preferably by embossing,
(a3) applying at least one metal to the release layer on the linearly moved substrate, in a vacuum chamber having a vaporizing section, by means of reactive physical vapor deposition (PVD) in the presence of oxygen, so that part of the metal reacts with oxygen to form metal oxide, and unreacted metal in the form of metal nanoparticles, and formed metal oxide, are deposited via the vaporizing section with formation of a gradient in relation to the direction of movement of the linearly moved substrate, to give a PVD layer or a plurality of PVD layers disposed one atop another,
or
(b1) applying a release layer to a linearly movable substrate,
(b2) applying at least one metal to the release layer on the linearly moved substrate, in a vacuum chamber having a vaporizing section, by means of reactive physical vapor deposition (PVD) in the presence of oxygen, so that part of the metal reacts with oxygen to form metal oxide, and unreacted metal in the form of metal nanoparticles, and formed metal oxide, are deposited via the vaporizing section with formation of a gradient in relation to the direction of movement of the linearly moved substrate, to give a PVD layer or a plurality of PVD layers disposed one atop another, (b3) introducing a diffractive structure onto and/or into at least one surface of the PVD layer applied in step (b2), preferably by embossing, and also (c) detaching the applied PVD layer(s) provided with a diffractive structure, (d) comminuting the detached PVD layer(s), (e) optionally transferring the comminuted PVD layer(s) into a dispersion or paste.

According to a further variant of the invention, the process encompasses the following steps:

(a1) applying a release layer to a linearly movable substrate, (a2) introducing a diffractive structure into the release layer, preferably by embossing, (a3) sequential application of layers A, B, and C one atop another by means of physical vapor deposition, by vapor application of metals $M_A$, $M_B$, and $M_C$ onto a linearly moved substrate, with at least the layers A and/or C being applied in the presence of at least one oxygen-donating oxygen source and where, correspondingly, the substrate for the layer A and/or B has a release layer with a diffractive structure, or (b1) applying a release layer to a linearly movable substrate, (b2) sequential application of layers A, B, and C one atop another by means of physical vapor deposition, by vapor application of metals $M_A$, $M_B$, and $M_C$ onto a linearly moved substrate, with at least the layers A and/or C being applied in the presence of at least one oxygen-donating oxygen source and where, correspondingly, the substrate for the layer A and/or B has a release layer with a diffractive structure, (b3) introducing a diffractive structure onto and/or into at least one surface of the PVD layer applied in step (b2), preferably by embossing, and also (c) detaching the applied PVD layer(s), (d) comminuting the detached PVD layer(s), (e) optionally transferring the comminuted PVD layer(s) into a dispersion or paste.

For the generation of a substantially homogeneous distribution of the metal nanoparticles in an oxidic matrix, there are a number of possible variants.

In the case of metal vaporization, using for example a vaporizer crucible (10), as illustrated in FIGS. 2 to 6, a region with very high metal density, this density decreasing radially, is produced centrally above the vaporizer—for example, vaporizer crucible (10).

The oxygen source, oxygen for example, may be admitted to the vacuum chamber (1) diffusely, via the oxygen inlet (15), as illustrated in FIG. 2. The metal vapor or metal oxide is then deposited on the linearly moved substrate (14), which is supplied through the shutter entrance (11) via a source roll (3) and a deflecting roll (4). The vapor-coated substrate is subsequently supplied via the shutter exit (12) and the deflecting roll (5) to the pickup roll (6). Located between the shutter entrance (11) and shutter exit (12) is the vaporizing section (13), in which the substrate (14) is vapor-coated. The process of deposition on the substrate (14) is monitored by means of transmission measurement (7; 8).

Figure 3:
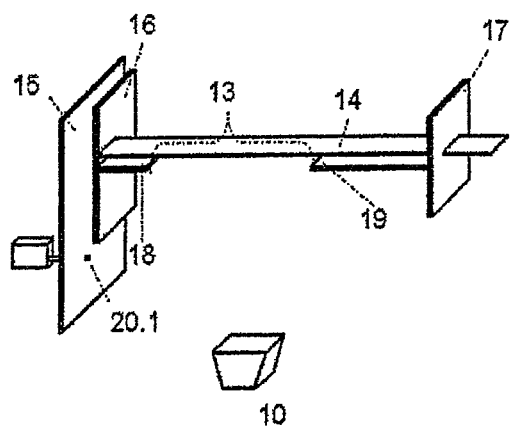
FIG. 3 shows an alternative construction in the region confined in section 2 of the PVD apparatus of FIG. 2.

FIG. 3 shows a simplified apparatus for implementing the process of the invention. The oxygen source, oxygen for example, is admitted diffusely into the vacuum chamber via the gas inlet 20.1. The vaporizer crucible (10) is disposed beneath the substrate on which vapor coating is to take place. The vaporizing section (13) is defined by the cover plate (18) at the shutter entrance (16) and by the cover plate (19) at the shutter exit (17).

This simple variant can be used, for example, for producing very thin metal layers having a thickness of less than 30 nm. It is preferred here to produce metal nanoparticle-containing metal oxide layers of titanium, aluminum, and/or chromium.

The homogeneity of the layers can be improved by a slightly reduced rate of metal vaporization, since the oxygen then disperses more readily into the metal vaporization cone that forms.

Figure 4:
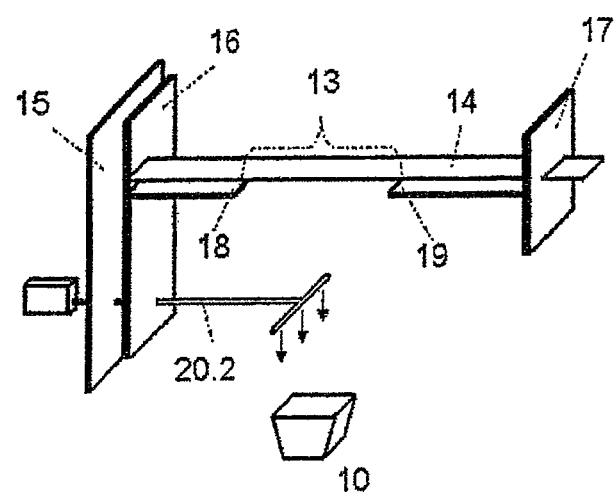
FIG. 4 shows an alternative construction in the region confined in section 2 of the PVD apparatus of FIG. 2.
Figure 5:
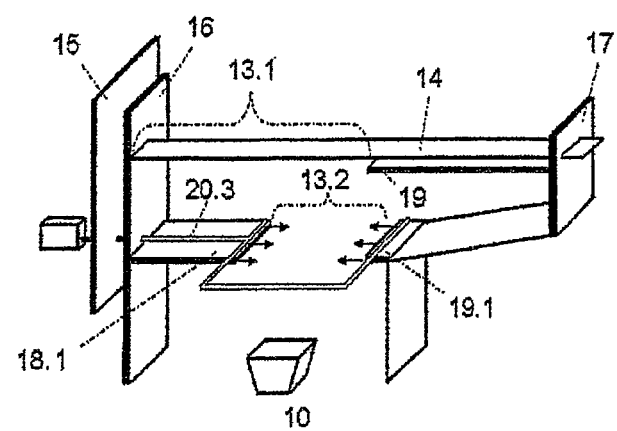
FIG. 5 shows an alternative construction in the region confined in section 2 of the PVD apparatus of FIG. 2.
Figure 6:
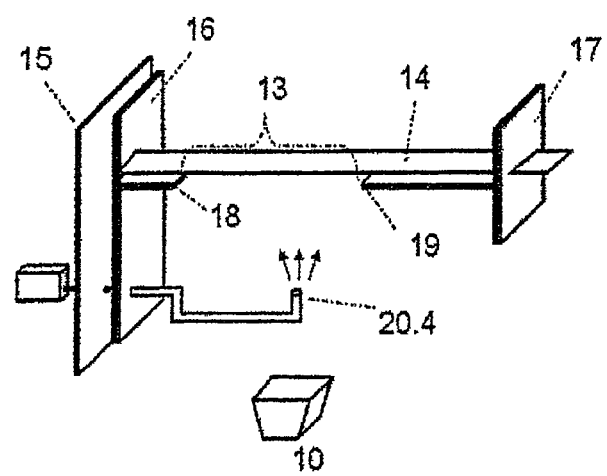
FIG. 6 shows an alternative construction in the region bounded by section 2 of the PVD apparatus of FIG. 2.

In order to generate layer thicknesses higher than 30 nm, preferably 40-50 nm, the oxygen can also be introduced into the vaporizing cone in a more targeted way, through laterally disposed oxygen lances (20.2, 20.3, 20.4) with corresponding openings, as is shown in FIGS. 4, 5, and 6. Supply via lateral oxygen lances (20.2, 20.3, 20.4) may take place unilaterally (FIGS. 4 and 6) or bilaterally (FIG. 5).

The coated substrates, typically foils, exhibit an initially dark gray transparent, slightly color-tinged appearance in the case of oxygen contents, for Al and Cr, of 40-55 atom %.

Following detachment and comminution of the film that has been applied by vapor deposition, the respective color effect of the pigment comes about in an application, since a plurality of pigments are present atop one another and give a uniform perceived color.

Another advantageous variant is to supply the oxygen or the oxygen source directly above the vaporizing crucible (10) or vaporizing boat in the case of very high metal vaporization rates. This is also shown, by way of example, in FIGS. 4 and 6.

For optimum conversion of the metal, particular suitability is possessed by the geometry shown in FIG. 6, since both the oxygen or oxygen source and the vaporized metal are supplied centrally and are converted in dependence on the amount of oxygen prior to deposition on the moved substrate.

In order to produce metallic effect pigments of the invention where the amount of metal differs by at least 10 atom % between the at least one layer comprising metal nanoparticles and metal oxide phase or metal oxide matrix and a second layer, it is possible to carry out vapor deposition on a commercial metal reflector foil, an example an aluminum foil having a layer thickness in a range of preferably from 10 nm-50 nm. The aluminum foil can be provided with a diffractive structure by embossing prior to vapor deposition. Here, in accordance with one preferred variant, oxidically embedded metal nanoparticles of Cr, Ti and/or Al are applied, and in interaction with the metal reflector, for example aluminum reflector or aluminum layer, may produce a blue appearance on the coated foil. Particularly advantageous for a blue coloration on an aluminum reflector (aluminum foil) is a layer thickness of oxidically embedded metal nanoparticles of Cr, Al, or Ti of around 60 nm.

Detachment and comminution of the film produces metallic effect pigments of the invention which are notable first for a strong metallic effect and secondly for a slight bluish tinge. The diffractive structure of the metallic effect pigments gives the metallic effect pigments a high-grade metallic, blue-tinged appearance with a rainbow.

Metallic effect pigments of the invention which contain a metal nanoparticle gradient in a metal oxide matrix can be produced, for example, with an apparatus which is shown in FIG. 5, where the oxygen source, oxygen for example, takes place only unilaterally, i.e., via the left-hand or right-hand gas inlet shown in FIG. 5.

An advantage in the case of this process variant is that the procedure can be controlled via reflection measurements, since a preferably blue coating is generated on a metallic reflector.

The extent of the rainbow effect can be influenced in this case by the diffractive structure embossed into the foil. In the case of embossed foils which have embossing only partially, the metallic luster, for example, is enhanced, and the rainbow effect is established in a restrained manner in the end application, in a paint or an ink.

In a further preferred embodiment, the metallic effect pigments of the invention have a three-layer construction, with the metals $M_A$, $M_B$, and $M_C$ in the layers A, B, and C being the same and being preferably aluminum. With the apparatus depicted in FIG. 6 it is possible to provide gold-colored embossed effect pigments in a simple way.

In the case of this variant, oxygen is supplied to the metal vaporization cone centrally via the vaporizer.

An advantageous feature of this process variant is that, for a supplied defined amount of oxygen or amount of metal vapor per unit time, it is possible to produce gold-colored embossed metallic effect pigments, i.e., pigments with a diffractive structure, with different layer thicknesses. The layer thicknesses here can be controlled via the set speed of the substrate, typically a polymeric film. When using aluminum as metal $M_A$, $M_B$ and $M_C$ here, a "gold range" is established for layer thicknesses of 30 nm to 250 nm, preferably of 50 nm to 150 nm, more preferably of 70 nm to 100 nm. The oxygen fraction in the case of these metallic effect pigments, in all of layers A, B, and C, is preferably between 30 and 35 atom %.

Accordingly, this process can also be utilized in a simple way in order to reduce the size of the metal nanoparticles, by means of further supply of oxygen gas, and, with different layer thicknesses, to generate dark to black pigments. There is a "black range" here for layer thicknesses of 15 nm to 250 nm, preferably of 30 nm to 150 nm, more preferably of 50 nm to 100 nm. In this variant of the metallic effect pigments, the oxygen fraction in all of layers A, B, and C is preferably in a range between 45 and 55 atom %.

A further preferred embodiment, in which the metal $M_B$ is different from the metals $M_A$ and $M_C$, represents the sequence of the vaporized metal with Cr/Al/Cr.

Metallic effect pigments of the invention that have this construction are notable for a particular corrosion resistance. The external chromium and/or chromium oxide layers protect the centrally disposed thin aluminum oxide layer, which contains aluminum nanoparticles and has a layer thickness, for example, in a range from 15 to 25 nm, effectively against corrosion. Commercial silver-colored pigments in this layer thickness range are found not to be resistant in corresponding QUV and chemicals testing.

One particularly preferred embodiment here is a highly lustrous embossed pigment. The layer thicknesses of the layers A and C, which comprise chromium nanoparticles in chromium oxide, are in a range from 15 to 20 nm, and the oxygen content is between 35 to 58 atom %, preferably from 40 to 45 atom %. In this embodiment the layer B is a PVD aluminum layer which has not been applied by vapor deposition under reactive conditions. This aluminum layer may comprise aluminum oxide on the surface. The core of this aluminum layer consists of metallic aluminum which is not present in the form of aluminum nanoparticles. The layer thickness of the layer B is in a range from 15 to 50 nm, preferably from 20 to 30 nm.

A particularly advantageous circumstance here is that, because of the low layer thicknesses of the chromium oxide layer, comprising chromium nanoparticles, it is possible to carry out coating at the same belt speeds as in the case of coating with the aluminum layer. Typical belt speeds here may be 800 m/min or even higher. The metering of oxygen into a thin Cr layer of 15 nm can be accomplished in a simple way via a diffuse oxygen inlet as per FIG. 3.

DESCRIPTION OF THE FIGURES

FIG. 1 shows the schematic construction of a metallic effect pigment of the invention with an embossed surface, with metal nanoparticles present in an oxidic matrix.

Referring now to FIG. 2, the reference numerals below correspond to the recited elements of the PVD apparatus, as follows:
1. Vacuum chamber
2. Virtual system boundary of the vapor deposition space
3. Source roll
4. and 5. Deflection rolls
6. Pickup roll
7. and 8. Transmittance measurement
9. Oscillating quartz measurement
10. Vaporizer crucible
11. and 12. Shutter entrance and shutter exit
13. Vapor deposition section
14. Substrate
15. Gas flow regulation and oxygen inlet into the left-hand vacuum chamber wall.

FIG. 2 shows the construction of a PVD apparatus in a vacuum chamber 1, in the form of a belt coating unit having a source roll 3, from which the linearly moving substrate 14 is unrolled. The substrate is then guided via the deflecting rolls 4 and 5 to the pickup roll 6. The shutters 11 and 11.1 and 12 and 12.1 represent the coating chamber. The shutters 11 and 12 delimit the vaporizing section 13, in which the linearly moved substrate is vapor-coated by means of PVD. The shutters 11.1 and 12.1 separate the vaporizing unit with vaporizer crucible 10 from the surroundings. The transmission measurement 7 and 8 or oscillating quartz measurement 9 allow the amount of deposited metal oxide and elemental metal to be ascertained.

FIGS. 3 to 6 show particular embodiments of the apparatus illustrated in FIG. 2.

Referring now to FIG. 3, the reference numerals below correspond to recited elements of the PVD apparatus of FIG. 2, as follows:
16. Left-hand masking plate (11 and 11.1) for film entry into the coating space
17. Right-hand masking plate (12 and 12.1) for film exit from the coating space
18. Masking plate of the shutter entrance
19. Masking plate of the shutter exit
20.1 Diffuser gas inlet.

FIG. 3 shows an alternative construction in the region confined in section 2 of FIG. 2, with a left-hand cover plate 16 (11 and 11.1) for the entry of the foil/film into the coating chamber, and with a right-hand cover plate for the exit 17 of foil/film (12 and 12.1) from the coating chamber. The coating region of the substrate is further bounded by the cover plates 18 and 19. Outside of the section 2 there is a small aperture for an optional diffuse gas inlet indicated in the left-hand vacuum chamber wall 15.

Referring now to FIG. 4, the reference numerals below correspond to recited elements of the PVD apparatus of FIG. 2, as follows:

20.2 Gas inlet pipe horizontal, centrally over the vaporizer with three small Openings, the outflow openings, each with a diameter of around 1 mm, being indicated by three small arrows.

FIG. 4 shows an alternative construction in the region confined in section 2 of FIG. 2. The gas supply is through a horizontal gas inlet tube 20.2 drawn in centrally above the vaporizer crucible 10 with three small apertures each with a diameter of around 1 mm. The outflow apertures are indicated by three small arrows.

Referring now to FIG. 5, the reference numerals below correspond to recited elements of the PVD apparatus of FIG. 2, as follows:

13.1 Vapor deposition section
13.2 Vapor deposition section
18.1 Left-hand bottom masking shutter of the vapor deposition section 13.2
19.1 Right-hand bottom masking shutter of the vapor deposition section 13.2
20.3 Right/left-hand-side gas inlet pipe having in each case three small openings, the outflow opening, each of around 1 mm, being indicated by three small arrows.

FIG. 5 shows an alternative construction in the region confined in section 2 of FIG. 2, having an upper coating section 13.1 and a lower coating section 13.2. The upper coating section 13.1 is bounded by the apparatus 16 and 19. The lower coating section 13.2 is described through the lower left-hand cover plate 18.1 and a right-hand lower cover plate 19.1. The supply of gas through a right-hand/left-hand gas inlet tube, each with three small openings with a diameter of approximately 1 mm in each case, from each side. The outflow openings are indicated by small arrows.

Referring now to FIG. 6, the reference numerals below correspond to recited elements of the PVD apparatus of as follows:

20.4 Gas inlet through a pipe which is vertical in the direction of vaporization and has an opening of around 4 mm.

FIG. 6 shows an alternative construction in the region bounded by section 2 of FIG. 2, where the supply of gas 18 realized with a gas inlet through a tube 20.4, which is vertical in the direction of vaporization, and with an opening of approximately 4 mm. The vertical tube is located on an axis with the vaporizer crucible 10.

Figure 7:
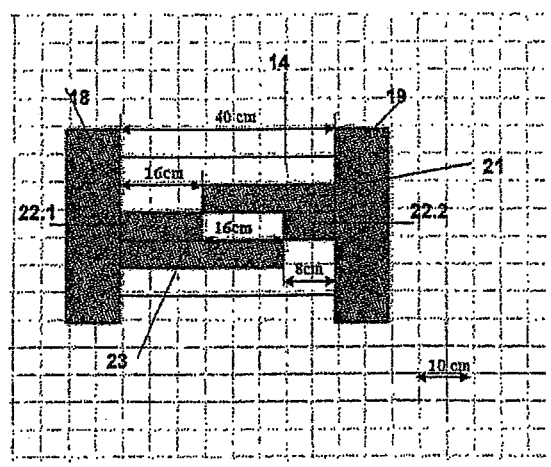
FIG. 7 is a plan view of the arrangement of the shutters for generating a sequential layer construction on the substrate.

Referring now to FIG. 7, the reference numerals below correspond to recited elements of the arrangement of the shutters, as follows:

21. Lengthwise shutter for the first layer section for example 7a
22.1 and 22.2 Lengthwise shutters for the middle layer section for example 7b
23. Lengthwise shutter for the last layer section for example 7c.

FIG. 7 shows the plan view of the arrangement of the shutters, for generating a sequential layer construction on the substrate, which moves at a constant belt speed, for example 7 and for comparative example 7. The longitudinal shutters here, 21, 22.1, and 22.2 and 23, confine the coating regions for examples 7a, 7b, and 7c and for comparative examples 7a, 7b, and 7c, respectively.

FIG. 8 shows a TEM image of the PVD layer from example 1. The dark patches are metal nanoparticles.

FIG. 9 shows the electron diffraction image associated with FIG. 8 of the PVD layer from example 1. The diffraction reflections are arranged in concentric rings. The zero-order reflection is blanked out. The concentric rings show that the black patches from FIG. 8 are metal nanoparticles.

Figure 10:
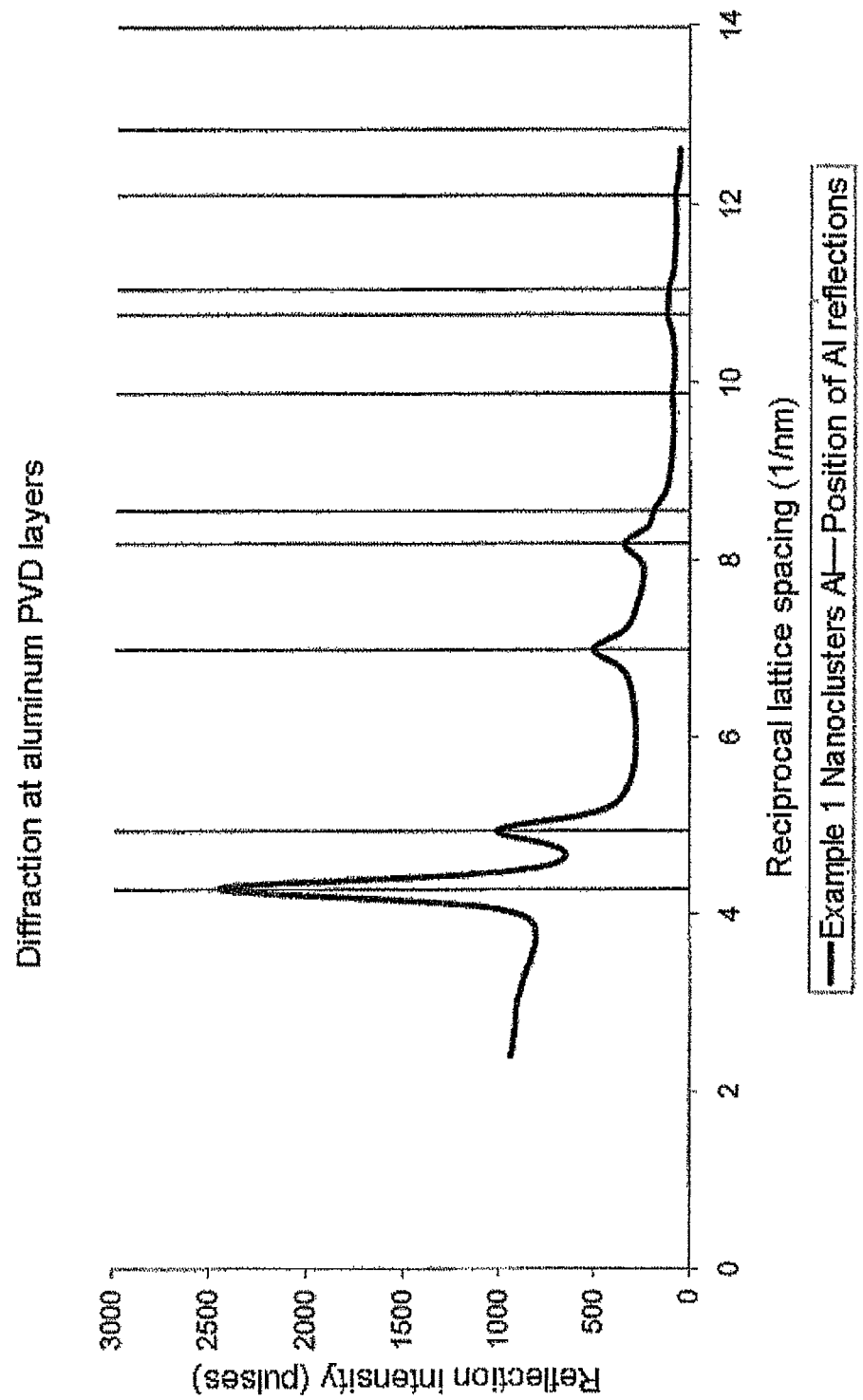
FIG. 10 represents the intensity distribution of the electron diffraction reflections of the oxidic aluminum layers of inventive Example 1.

FIG. 10 represents the intensity distribution of the electron diffraction reflections of the oxidic aluminum layers from inventive example 1. The plot is of reflection intensity against reciprocal lattice spacing.

FIGS. 11a and 12a each show concentration distributions, determined by means of xPS/ESCA sputter profiles, for the elements oxygen (O), elemental metal (Al(0) or Ti(0), respectively), and carbon (C) for the pigments of inventive example 4 and of comparative example 4.

FIGS. 11b and 12b in each case represent the ratio of elemental metal to oxidized metal in atom % over the layer thickness, these figures corresponding to FIGS. 11a and 12a, but without the oxygen fraction.

Figure 13A:
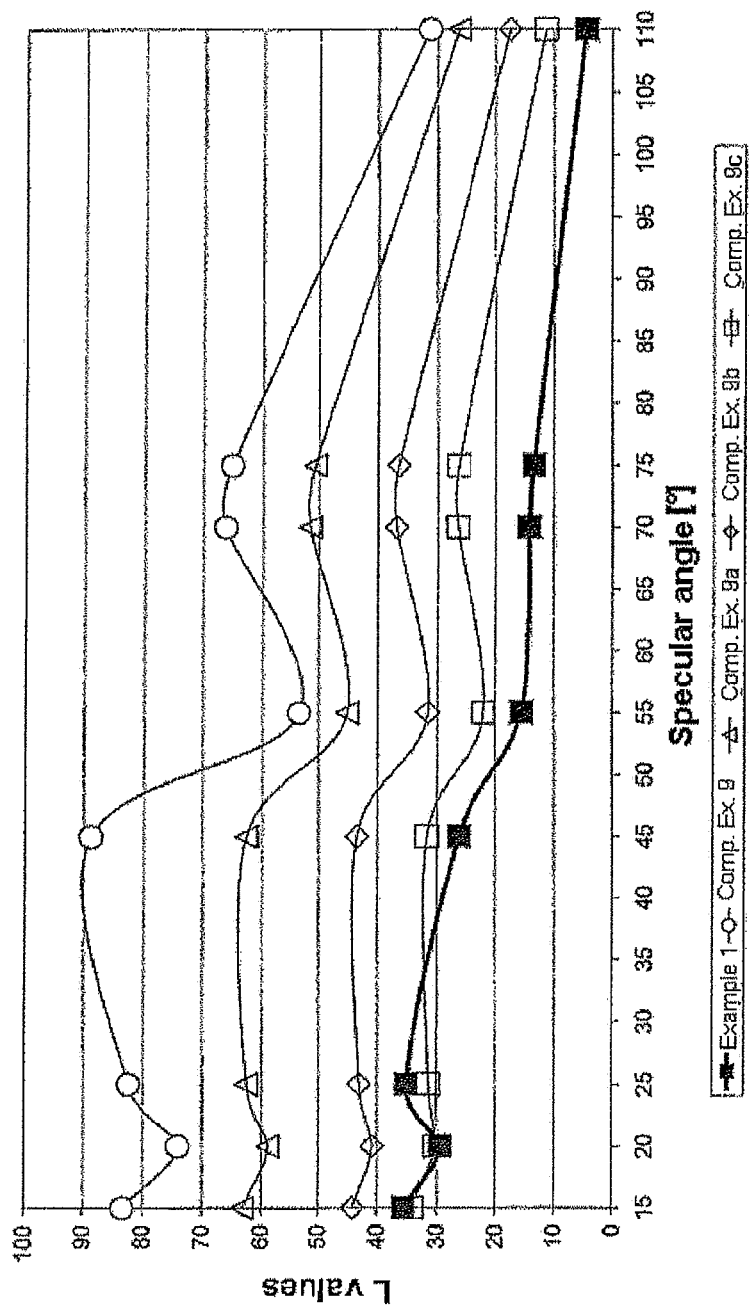
FIG. 13a shows the colorimetric CIELAB data of the L* data of the pigments of inventive Example 1 and of Comparative Examples 9, 9a, 9b and 9 c.
Figure 13B:
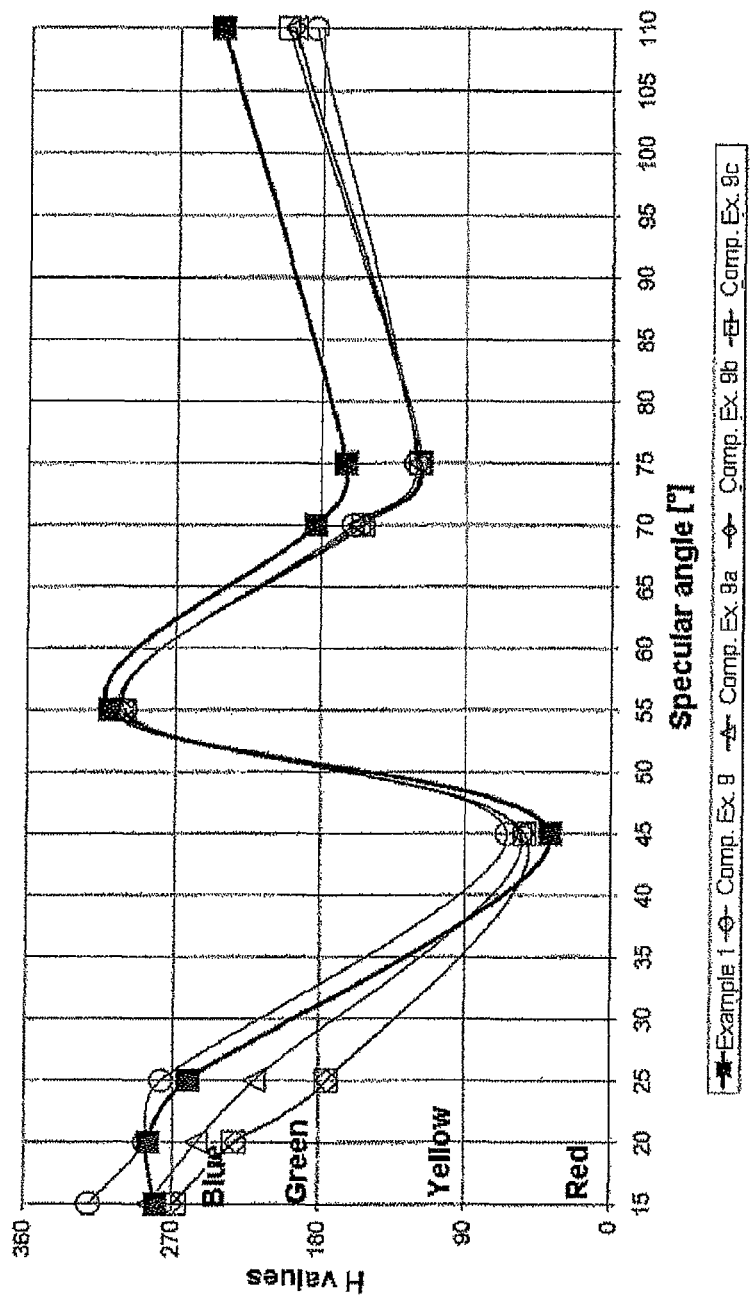
FIG. 13b shows the colorimetric CIELAB data of the H* data of the pigments of inventive Example 1 and of Comparative Examples 9, 9a, 9b, and 9c.
Figure 13C:
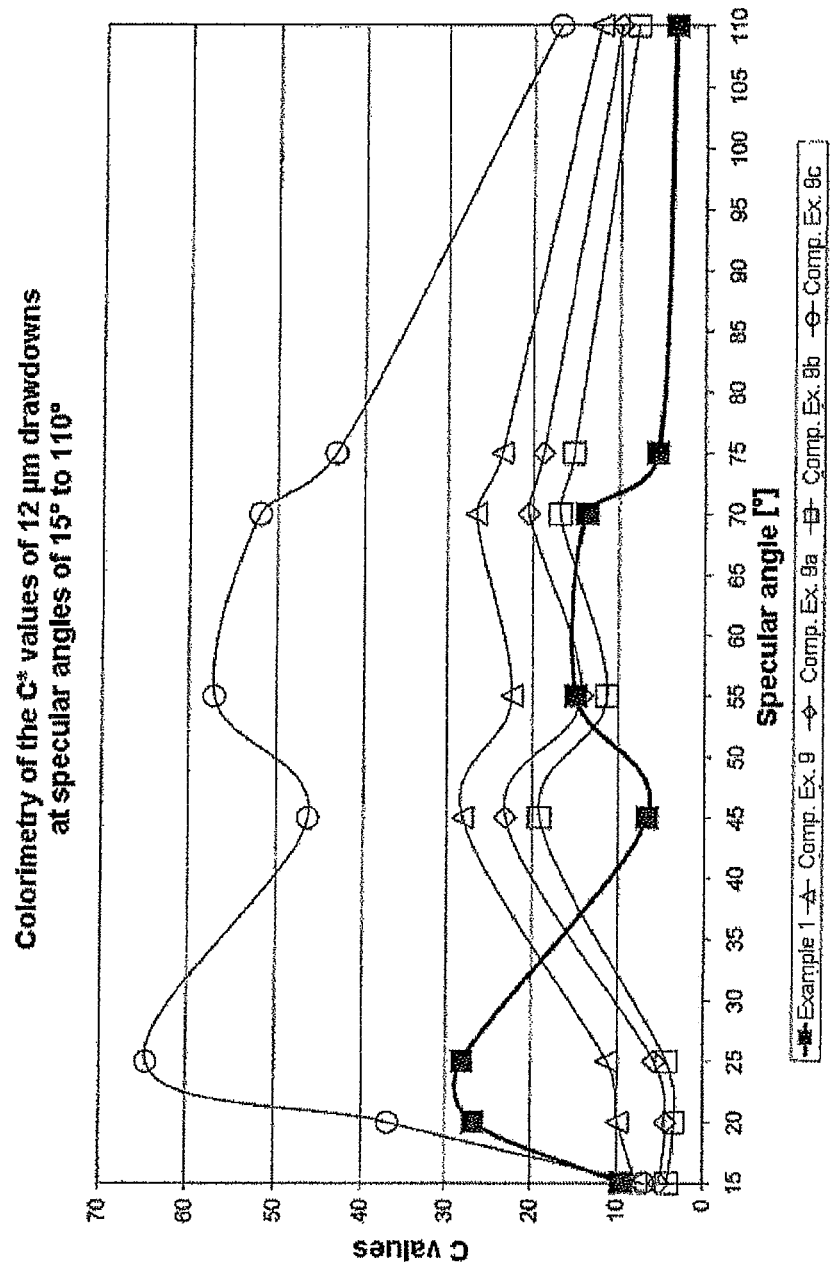
FIG. 13c shows the colorimetric CIELAB data of the C* data of the pigments of inventive Example 1 and of Comparative Examples 9, 9a, 9b, and 9c in FIG. 13d is the spectral evaluation of the colorimetry of the spectra of 12 µm drawdowns of the pigments of Example 1 and of Comparative Examples 9, 9a, 9b, and 9c in the visible wavelength range of in each case 400-700 nm at the three measured specular angles of 25°, 45°, and 75° in each case.

FIGS. 13a, 13b, and 13c show the colorimetric CIELAB data of the L*, H* and C* data of the pigments from inventive example 1 and from comparative examples 9, 9a, 9b, and 9c.

FIG. 13.d represents the spectral evaluation of the colorimetry of the spectra of 12 μm drawdowns of the pigments from example 1 and from comparative examples 9, 9a, 9b, and 9c in the visible wavelength range of in each case 400-700 nm at the three measured specular angles of 25°, 45°, and 75° in each case.

Figure 14A:
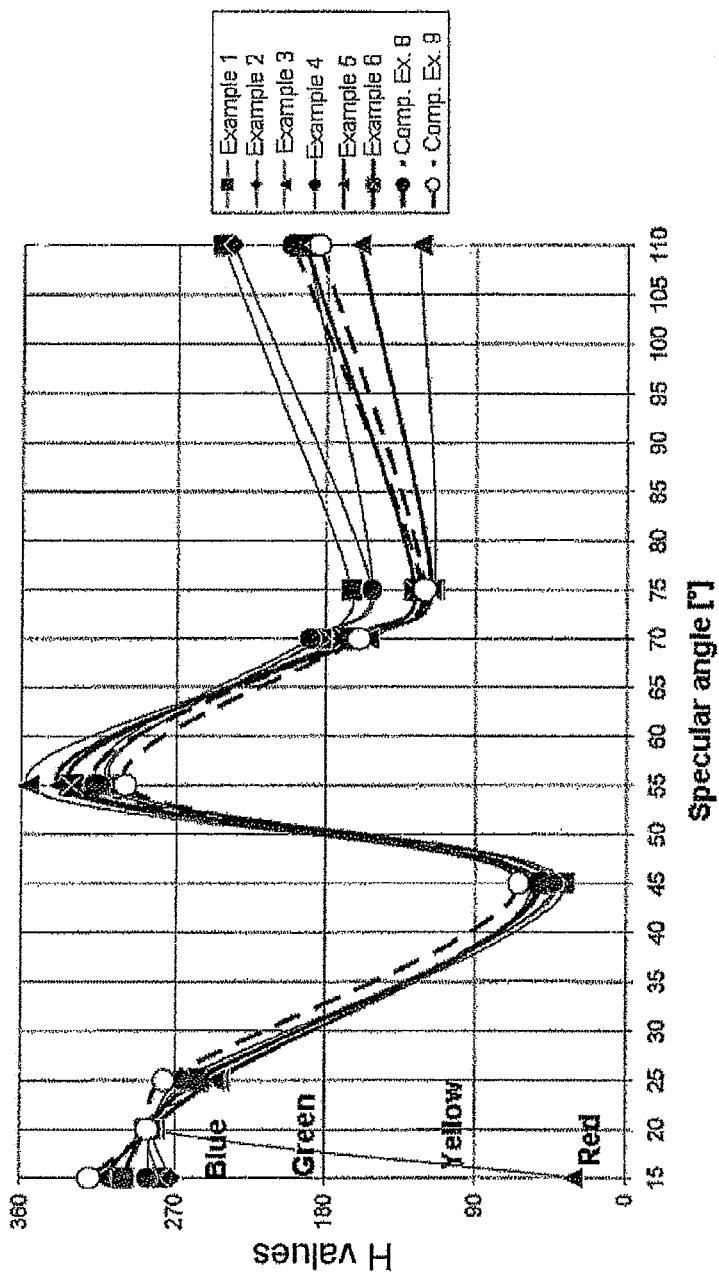
FIG. 14a shows the comparison of the H* profiles of the CIELAB data of the pigments of inventive Example 1-6 and of Comparative Examples 8 and 9.
Figure 14B:
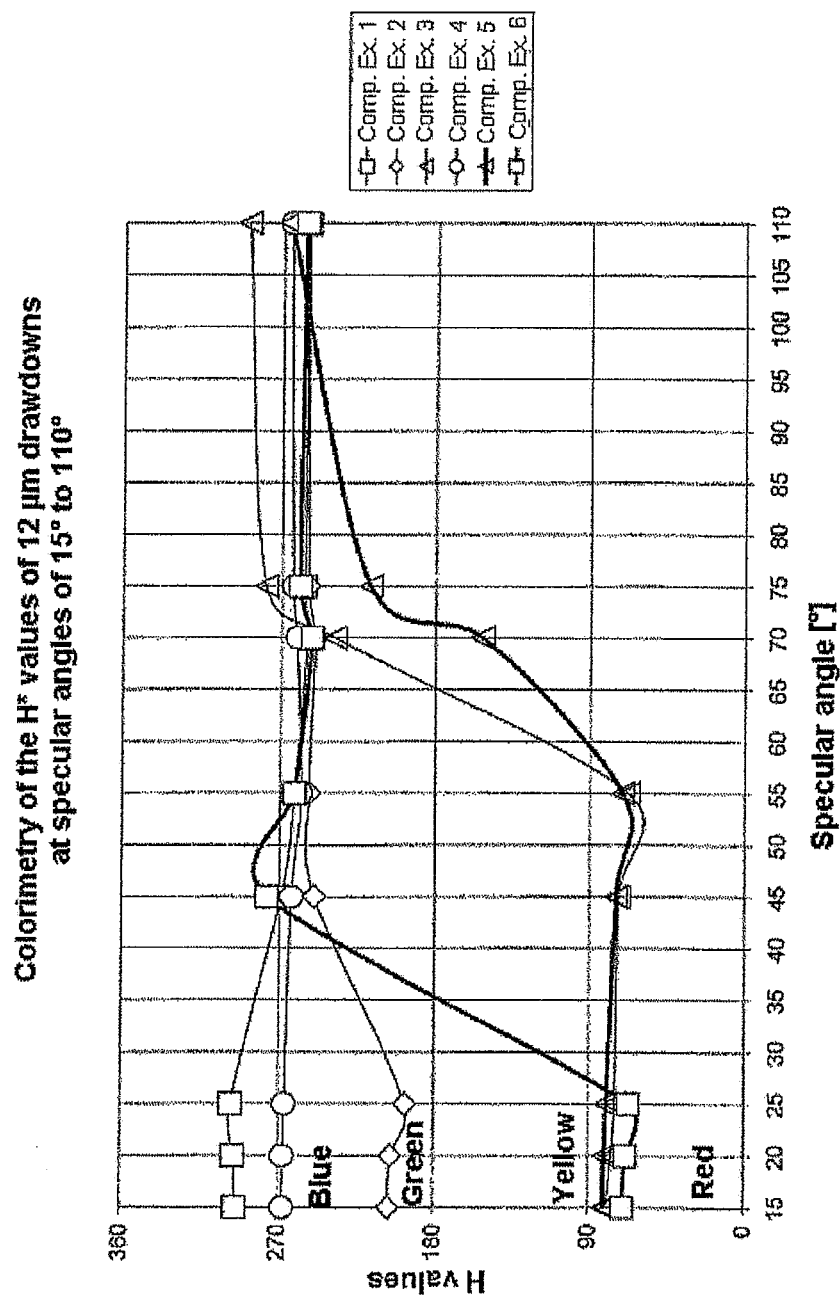
FIG. 14b shows the comparison of the H* profiles of the CIELAB data of the pigments of Comparative Examples 1-6.

FIGS. 14a and 14b show the comparison of the H* profiles of the CIELAB data of the pigments from inventive examples 1-6 and from comparative examples 8 and 9 and comparative examples 1-6.

Figure 15:
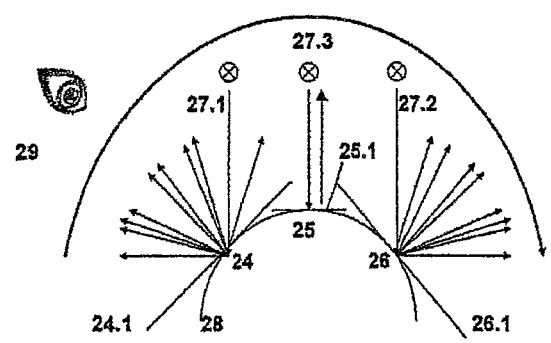
FIG. 15 is a schematic diagram of the illumination and observation arrangement of subjective color impression of a viewer around a curved and illuminated knife application through the light sources 27.1, 27.2, and 27.3 in accordance with table 5.

Referring now to FIG. 15, the reference numerals below correspond to recited elements of the schematic diagram of the illumination and observation arrangement of subjective color impression of a viewer around a curved and illuminated knife application through the light sources 27.1, 27.2, and 27.3 in accordance with table 5, as follows:

24. Reflection point and reflection angle of the light source of the linear light beam 27.1 of the drawdowns 28, produced and curved for viewing, as per Table 5
24.1 and 26.1 Indicated area of a surface illuminated approximately at 45°
25.1 Indicated horizontal area in regions of perpendicular reflection
25. Reflection point and reflection angle of the light source of the linear light beam 27.3 of drawdowns 28, produced and curved for viewing, as per Table 5
26. Reflection point and reflection angle of the light source of the linear light beam 27.2 of drawdowns 28 produced and curved viewing as per Table 5
27.1 Position 1 light source; 27.2 Position 2 light source; 27.3 Position 3 light source
28. Curved drawdown
29. Direction of view of an observer onto the curved sample.

FIG. 15 shows the viewing direction 29 of a viewer around a curved and illuminated knife application through the light sources 27.1, 27.2, and 27.3 in accordance with table 5. The appearance generated to the observer as a result of the direction of viewing at the reflection points 24, 25, and 26 is compiled in table 5.

Figure 16:
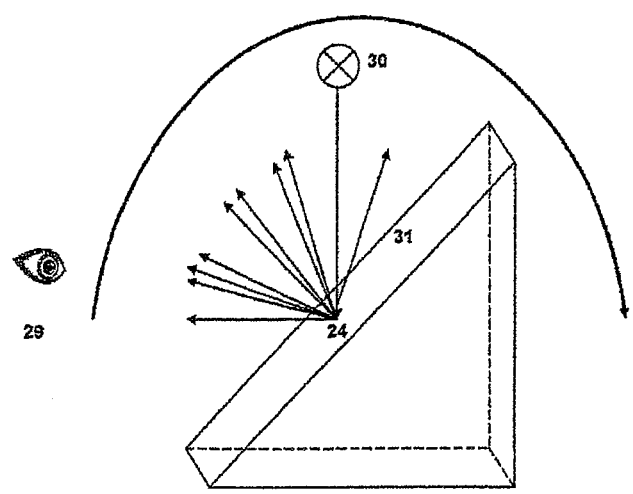
FIG. 16 illustrates the geometric arrangement for the colorimetric measurement of the drawdowns.

Referring now to FIG. 16, the reference numerals below correspond to recited elements of the eometric arrangement for the colorimetric measurement of the drawdowns, as follows:

30. Light source: D65
31. Pigment-coated area of a drawdown onto a surface inclined at 45°.

FIG. 16 describes the geometric arrangement for the colorimetric measurement of the drawdowns. The light source 30 here shines constantly onto a surface 31 which is inclined at 45° and on which the respective drawdown is disposed.

Figure 17:
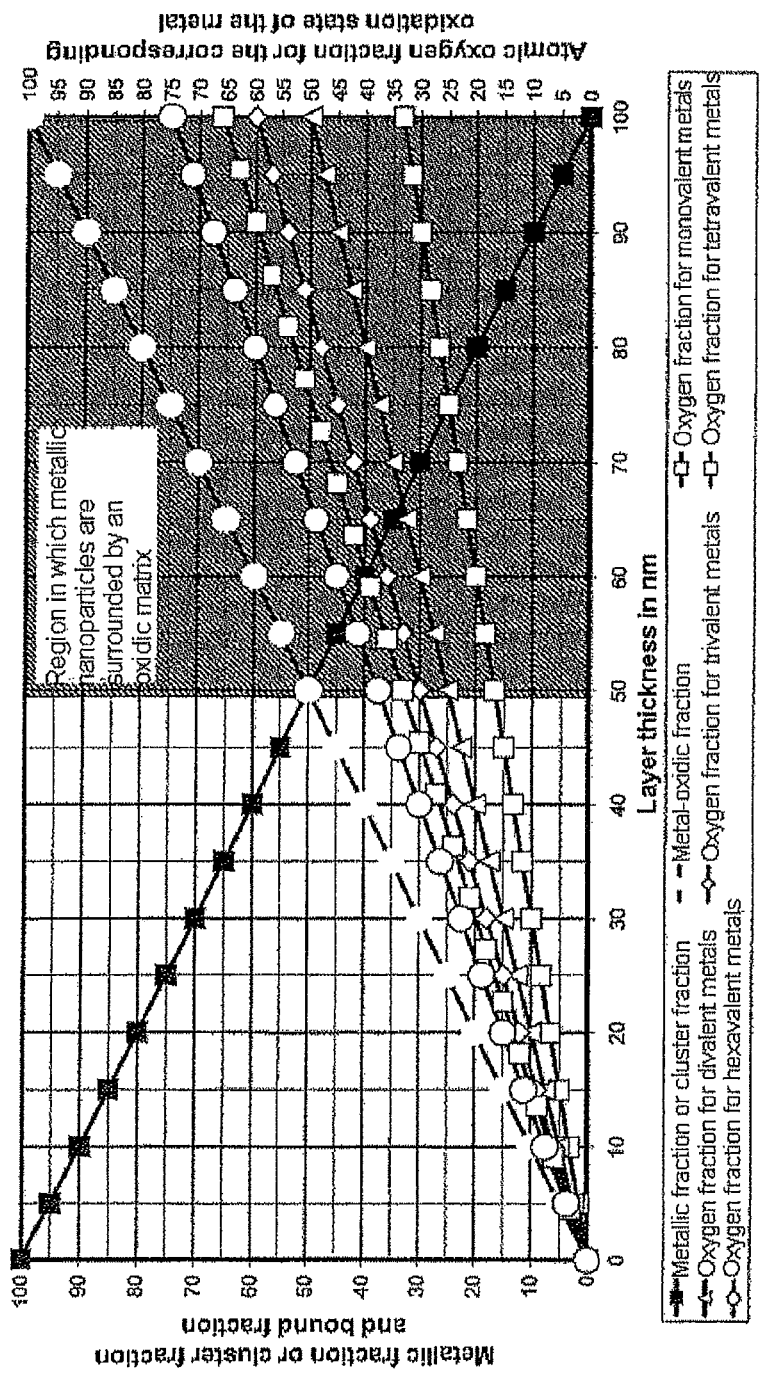
FIG. 17 is a graph showing the amount of metal nanoparticles in a metallic effect pigment depending on the oxygen content and on the oxidation state of the metal.

FIG. 17 shows the amount of metal nanoparticle in a metallic effect pigment in dependence on the oxygen content and on the oxidation state of the metal.

Figure 18:
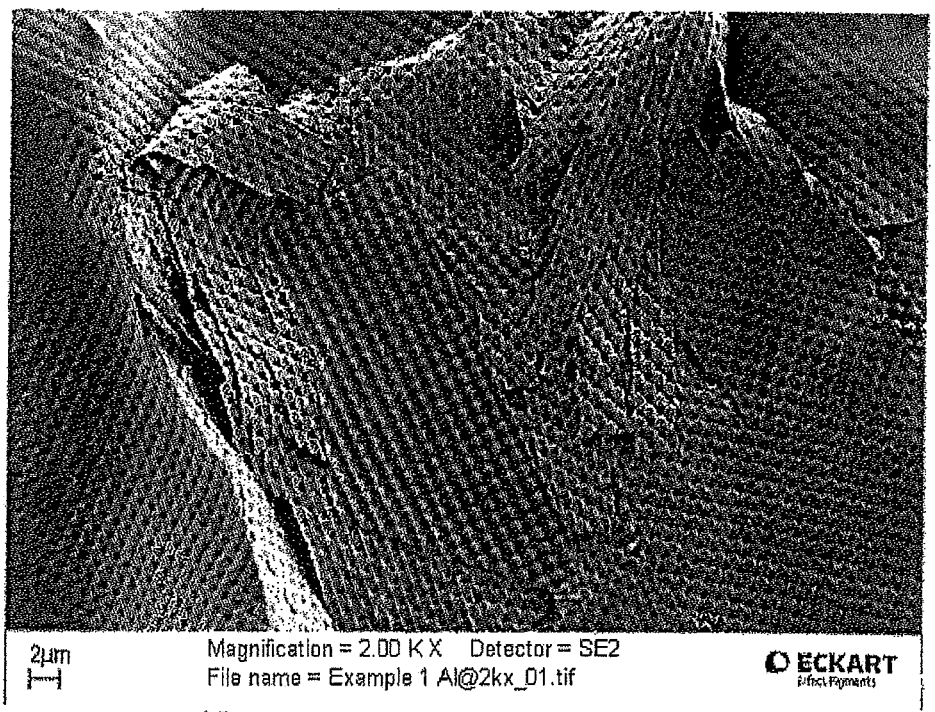
FIG. 18 is a scanning electron microscopy micrograph of the metallic effect pigments of inventive Example 1 in which the embossed frustoconical structures are very visible.

FIG. 18 shows an SEM micrograph of the metallic effect pigments of inventive example 1 in which the embossed frustoconical structures are very visible.

EXAMPLES

In the text below, the production, characterization, and colorimetric evaluation of the metallic effect pigments of the invention are described with reference to inventive and comparative examples, without imposing any restriction on the invention.

Part A: Production of the inventive metallic effect pigments with reference to inventive examples 1-7 and comparative examples 1-7 and 8, which illustrate the prior art. Examples 1-7 (embossed) and reference examples comp.—1-7 (unembossed) are produced correspondingly by the coating process and therefore have the same structural composition within the inventive pigments (examples 1-7) and the pigments from the prior art (comp. examples 1-7).

Part B: Characterization of the structural composition of the inventive PVD metallic effect pigments of inventive examples 1, 2, and 7c and of comparative examples comp.—3a, comp.—4a, comp.—4b, comp.—8, and comp.—9, on the basis of TEM measurements (transmitted light, diffraction).

For further characterization, a commercial Metalure product, comp. example 9, and an internally produced, silver-colored Metalure type, comp. example 8, were investigated for their structural composition.

Part C: Characterization of the structural composition of the inventive pigments on the basis of EDX measurements—see substance table 2.

Part D: Characterization of the profile of oxygen and/or metal over the layer thickness from the top face A to the bottom face B on the basis of sputter profiles (elemental analysis ESCA and statement of the oxidation states of the metal present in the layer) for inventive examples 4 and comparative example 4.

Part E: Calorimetric evaluation of the inventive embossed PVD metallic effect pigments.

Part A: Preparation of the Inventive Metallic Effect Pigments and Comparative Pigments in Accordance with Inventive Examples 1-7 and Comparative Pigments 1-7 and 8

Step 1: Coating of the Carrier Film

The general production of the metallic effect pigments took place in accordance with the process parameters in table 1.

For the individual examples and reference examples, a few meters of an embossed film from the company CfC were additionally spooled on in each case directly adjoining an already wound unembossed film (source roll 3 as per FIG. 2). The reference roll used was an unembossed polyethylene terephthalate (PET) film having a thickness of 23 µm, coated with a release coat, as substrate. The release coat consisted of acetone-soluble methyl methacrylate resin and was applied conventionally beforehand in a separate workstep.

The vaporization technique used was the electron-beam vaporization technique.

Moreover, a distinction was made between a one-stage and a two-stage, and also a three-stage, coating process.

The one-stage process describes the production of PVD metallic effect pigments in accordance with the examples, with a single coating step.

The two-stage process describes the production of PVD metallic effect pigments in accordance with inventive examples, by two separate, successive coating steps. The three-stage process describes the production of PVD metallic effect pigments in accordance with inventive examples, by three separate, successive coating steps.

A constant coating rate of the layer thicknesses of the vapor-deposited PVD metal layer and of the oxide incorporated therewith on the substrate was monitored via the mass coverage produced, by means of an oscillating quartz 9, located statically in a vacuum chamber 1, and of an online transmission measurement 7 and 8, in accordance with FIG. 2.

The mass coverage produced on the substrate is determined from the distance between substrate and metal vaporizer, the length L of the shutter aperture, the belt speed of the substrate, and the respective vaporization rate.

The gas flow required for the examples was supplied by means of a gas flow regulator (mass flow controller) from the company MKS, Munich, Germany. The location of the oxygen supply in each case is shown schematically in FIGS. 3, 4, 5, and 6.

Mass coverage on the substrate was determined for the examples by weighing following removal of the film.

A constant coating rate was ensured by means of an oscillating quartz measurement 9 and an online transmission measurement 7 and 8 in accordance with FIG. 2.

TABLE 1

Process parameters for the examples produced

| Substrate | Patent example | Vaporized substance | Vaporization geometry | Belt speed [m*min$^{-1}$] | Oxygen amount [sccm] | Chamber vacuum [1*10$^{-4}$ mbar] | Mass coverage [g*m$^{-1}$] | Type of belt process |
|---|---|---|---|---|---|---|---|---|
| Embossed | 1 | Al | FIG. 5 | 32 | 500 | 1.7 | 0.076 | One-layer |
| | 2 | Cr | FIG. 6 | 32 | 400 | 9 | 0.141 | One-layer |
| | 3a | Cr | FIG. 3 | 24 | 300 | 2.5 | 0.055 | |
| | 3b | Al | FIG. 3 | 20 | — | 0.9 | 0.1 | |
| | 3c | Cr | FIG. 3 | 24 | 300 | 1.38 | 0.117 | |
| | 3 | | | | | | 0.272 | Three-layer |
| | 4a | Al | FIG. 3 | 20 | — | 1.15 | 0.054 | |
| | 4b | Ti | FIG. 6 | 16 | 1100 | 3.95 | 0.207 | |
| | 4 | | | | | | 0.276 | Two-layer |

TABLE 1-continued

Process parameters for the examples produced

| Substrate | Patent example | Vaporized substance | Vaporization geometry | Belt speed [m*min$^{-1}$] | Oxygen amount [sccm] | Chamber vacuum [1*10$^{-4}$ mbar] | Mass coverage [g*m$^{-1}$] | Type of belt process |
|---|---|---|---|---|---|---|---|---|
| | 5 | Al | FIG. 6 | 32 | 200 | 5.7 | 0.176 | One-layer |
| | 6 | Al | FIG. 6 | 16 | 500 | 3.5 | 0.283 | One-layer |
| | 7a | Al | FIG. 6 and | 16 | 500 | 2 | | |
| | 7b | Al | FIG. 7 | | | | | |
| | 7c | Al | | | | | | |
| | 7 | Al | | | | | 0.324 | One-layer |
| Unembossed | Comp. -1 | Al | FIG. 5 | 32 | 500 | 1.7 | 0.076 | One-layer |
| | Comp. -2 | Cr | FIG. 6 | 32 | 400 | 9 | 0.141 | One-layer |
| | Comp. -3a | Cr | FIG. 3 | 24 | 300 | | 0.055 | |
| | Comp. -3b | Al | FIG. 3 | 20 | — | 0.9 | 0.1 | |
| | Comp. -3c | Cr | FIG. 3 | 24 | 300 | 1.38 | 0.117 | |
| | Comp. -3 | | | | | | 0.272 | Three-layer |
| | Comp. -4a | Al | FIG. 3 | 20 | — | 1.15 | 0.054 | |
| | Comp. -4b | Ti | FIG. 6 | 16 | 1100 | 3.95 | 0.207 | |
| | Comp. -4 | | | | | | 0.276 | Two-layer |
| | 5 | Al | FIG. 6 | 32 | 200 | 5.7 | 0.176 | One-layer |
| | Comp. -6 | Al | FIG. 6 | 16 | 500 | 3.5 | 0.283 | One-layer |
| | Comp. -7a | Al | FIG. 6 and | 16 | 500 | 2 | | |
| | Comp. -7b | Al | FIG. 7 | | | | | |
| | Comp. -7c | Al | | | | | | |
| | Comp. -7 | Al | | | | | 0.324 | One-layer |
| Embossed | Comp. -8 | Al | FIG. 3 | 20 | — | 1.1 | 0.121 | One-layer |

Step 2: Detachment from the Carrier Film and Comminution

Following physical vapor deposition, the individual PVD layers or PVD layer stacks in accordance with the respective examples were obtained from the carrier film by detachment with solvent from the release-coated substrate. In the resultant suspensions, residues of the release layer ("release coat") were separated from the detached PVD layers or PVD layer packages using solvent, and washed.

The external appearance generated by the coating process on the pigments is indicated in table 3 following the detachment of the pigments from the carrier layer.

The detached layers may be comminuted for example as described in section E.

Part B: Characterization of the Structural Composition of the Inventive PVD Metallic Effect Pigments of Inventive Examples 1, 2, and 7c and of Comparative Examples Comp.—3a, Comp.—4a, Comp.—4b, Comp.—8, and Comp.—9, on the Basis of TEM Measurements (Transmitted Light, Diffraction).

For further characterization, a commercial Metalure type, comp. example 9, and an internally produced, silver-colored Metalure type, comp. example 8, were investigated for their structural composition.

The instrument used was a Zeiss 922 Omega (from Zeiss). It was equipped with an Ultrascan 1000 CCD detector (from Gatan). The imaging medium used was an electron beam, which illuminated the PVD metallic effect pigments and their layer section uniformly and largely in parallel. The acceleration voltage was 200 kV. The electrons were scattered at inhomogeneities in the sample and diffracted at lattice structures. After departing the layer, the electrons were focused through an electron optical system into the intermediate image plane, and, after passing through a further magnification stage, were imaged by means of an electronic CCD camera system. In this way, a real depiction of the illuminated layer was obtained.

Figure 8A:
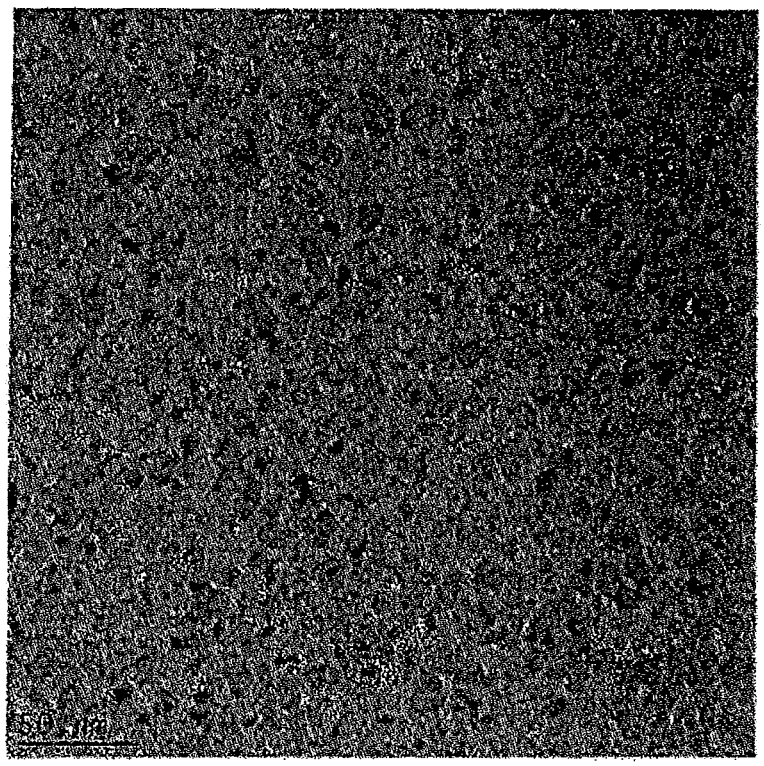
FIG. 8a is a transmission electron microscopy image of the PVD layer of inventive Example 1.
Figure 8B:
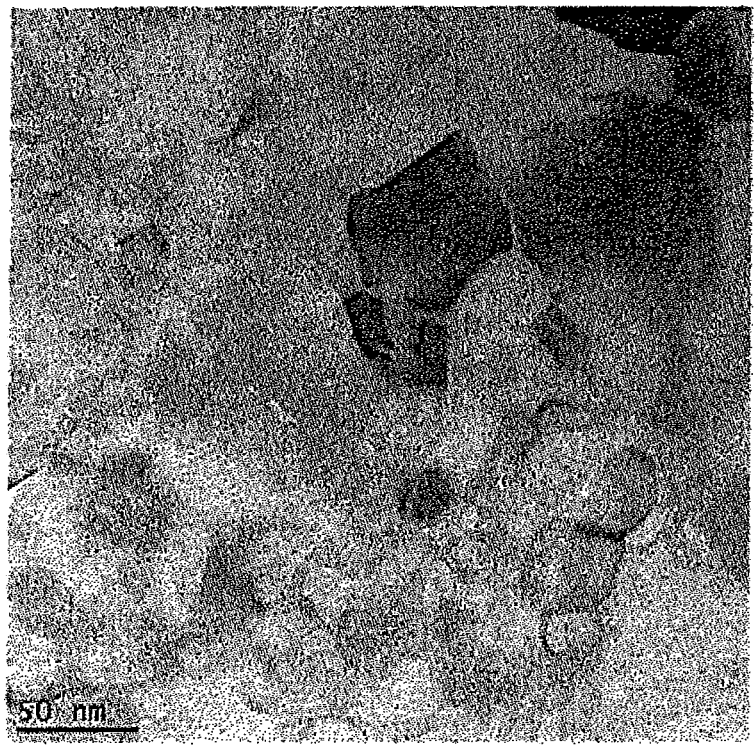
FIG. 8b is a transmission electron microscopy image of the PVD layer of Comparative Example 9.
Figure 9A:
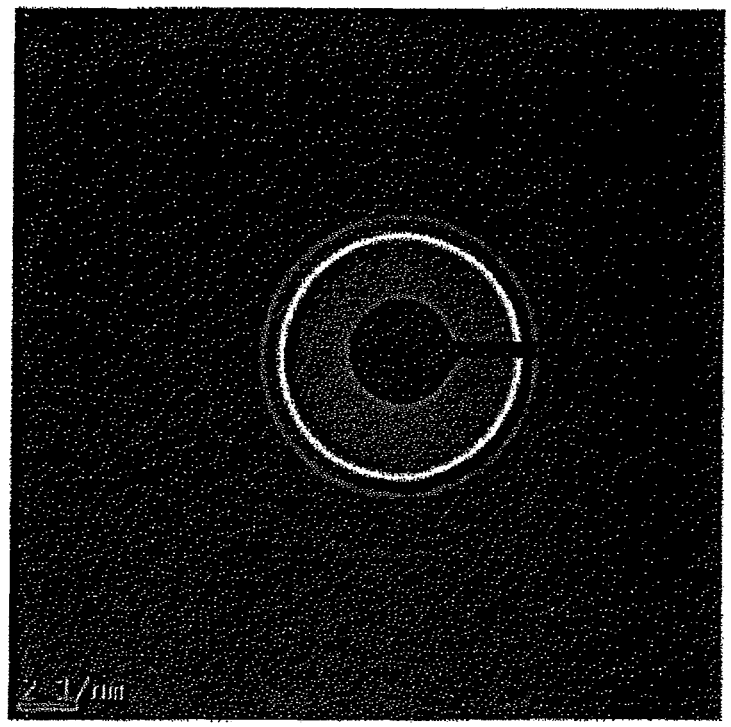
FIG. 9a is an electron diffraction image associated with FIG. 8a of the PVD layer of inventive Example 1.

TEM micrographs of the inventive examples showed that metal crystallites a few nanometers in size were present in a largely amorphous matrix of metal oxide. FIG. 8a shows by way of example a TEM micrograph for example 1.

In contrast, the comparative examples 8 and 9 showed a fundamentally different structure to the materials described above. The conventional metallic structure was found, with well-formed crystals in different orientations. This is depicted by way of example in FIG. 8b for comparative example 9.

The monoenergetic imaging electrons are diffracted at crystalline structures as the beam passes through the samples. In analogy to the Debye-Scherrer method in the case of fine crystal powders in unordered orientations, the electron diffraction reflections are located on circle arcs, at which the Bragg conditions are met for the respective crystal network planes.

From the position, the distributions, and the intensities of the diffraction reflections in the electron diffraction image it is possible to show unambiguously that the diffracting structures of the inventive examples consist of small crystallites of metallic aluminum, chromium, or titanium. These crystallites are oriented randomly and are in each case of a size and of a number such that the respective reflections overlap to form a continuous diffraction ring. This situation is shown by way of example in FIG. 9a for inventive example 1. FIG. 10 shows by way of example the measurement of the diffraction intensity for inventive example 1.

Figure 9B:
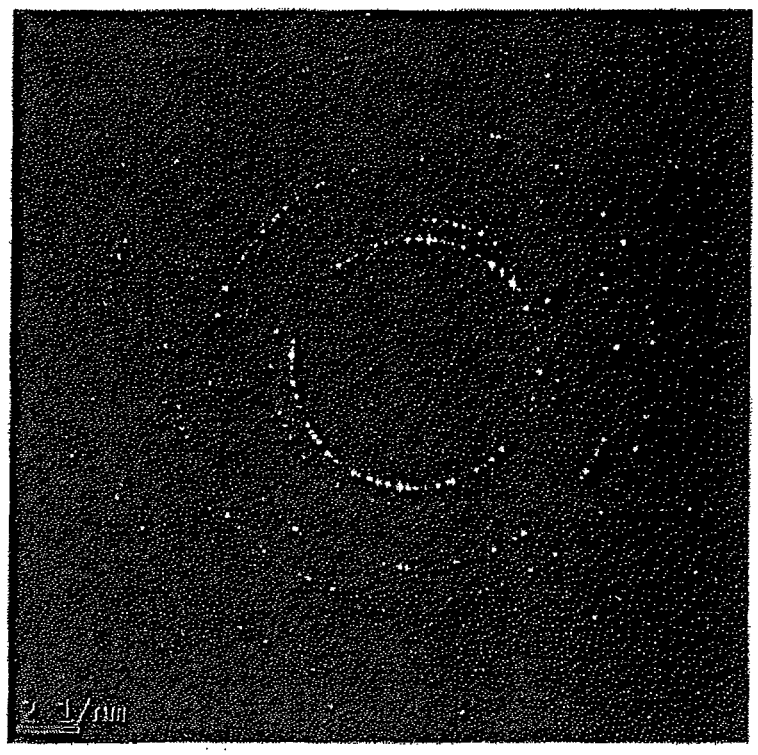
FIG. 9b is an electron diffraction image associated with FIG. 8b of the PVD layer of Comparative Example 9.

In contrast, comparative examples 8 and 9 have very sharply defined and discrete diffraction reflections. This shows that only a few large crystallites have participated in the diffraction. FIG. 9b shows these circumstances by way of example for comparative example 9.

In the case of the inventive examples with aluminum metal nanoparticles, moreover, a broad background of scattered reflections is found. No reflections other than the Al diffraction reflections are detectable, and hence it can be assumed that the matrix surrounding the metal crystallites is amorphous.

The profile of the reflection intensity in the electron diffraction image of the inventive chromium layers for example 2 or 3a shows that the diffraction maxima are located exactly in the positions to be expected of metallic chromium, and show the corresponding intensity distribution in the reciprocal space. The reflections are significantly broadened, which likewise shows that the diffracting metal crystals can only be of nanometer size. This reliably verifies the existence of these Cr metal metal nanoparticles. In addition to the chromium reflections, there is a further reflection above a continuously descending intensity background. This suggests that the chromium oxide is not exclusively amorphous, but is instead in semicrystalline form.

Corresponding results are obtained for the titanium layer of example 4b. Here again, very small metal crystallites are found in a semicrystalline oxide matrix.

Part C: Characterization by Means of SEM and EDX
Analytical Oxygen Determination by Means of EDX Measurements:

The oxygen and metal composition of the layers in accordance with inventive examples 1-7 and comparative examples 1-7 was determined using the above-described measurement methodology by means of EDX (instrument: EDAX Gemini; from EDAX Incorp., USA). A match of the physical data was evident on the basis of the same coating parameters, as already described above (under step 1).

Sample Preparation:

The layers were dispersed in a solvent and comminuted. A few drops of the dispersion were applied to a sample plate, and the solvent was slowly evaporated at room temperature. The layers took on an orientation largely parallel to the plate surface.

Measurement:

The mean atomic ratio of oxygen to metal was determined for the layers of the inventive examples.

For this purpose, first of all, a search was carried out, using scanning electron micrographs, for regions in which at least 4 to 5 individual separate PVD layers were superimposed on one another. Measurement was carried out at these locations. For the measurements on the aluminum/aluminum oxide layers, an acceleration voltage of 5 kV was selected; for the chromium/chromium oxide layers, a voltage of 8 kV was operated. This ensured that, for effective averaging, there were always two or more layers excited simultaneously, without measurement of the substrate background as well. Excitation took place in each case, for oxygen, of the K line (excitation energy: about 0.5 keV), for chromium, of the Kα line (excitation energy: about 5.4 keV), and, for aluminum, of the Kα line (excitation energy; about 1.5 keV). The excited x-ray spectrum was subjected to measurement, and the fraction of oxygen and metal, respectively, was determined from the peak height ratio with the aid of a software program.

TABLE 2

Physical data

| Substrate | Patent example | Vaporized substance | Layer thickness from SEM [nm] | Atomic oxygen [%] EDAX analysis | Atomic oxygen [%] ESCA analysis | Nanoparticle fraction from ESCA analysis | Metallic or metal nanoparticle fraction calculated via stoichiometry | Layer system |
|---|---|---|---|---|---|---|---|---|
| Embossed | 1 | Al | 33 | 44 | | | 27 | One-layer |
| | 2 | Cr | 35-38 | 43-46 | | | 20 | One-layer |
| | 3a | Cr | 23-25 | 53 | | | 12 | |
| | 3b | Al | 26-29 | 18 | | | 70 | |
| | 3c | Cr | 31-35 | 34 | | | 43 | |
| | 3 | | 77 | 24 | | | | Three-layer |
| | 4a | Al | 24-26 | | see FIG. 11a | | | |
| | 4b | Ti | 80-87 | | see FIG. 11a | | | |
| | 4 | | 93-101 | 50-63 | | see FIG. 11a | | Two-layer |
| | 5 | Al | 30 | 30 | | | | One-layer |
| | 6 | Al | 112-119 | 54 | | | 10 | One-layer |
| | 7a | Al | 53 | 38 | | | 37 | |
| | 7b | Al | 65 | 50 | | | 17 | |
| | 7c | Al | 49 | 48 | | | 20 | |
| | 7 | Al | 156-169 | 38 | | | 37 | One-layer |
| Unembossed | Comp. -1 | Al | 33 | 44 | | | 27 | One-layer |
| | Comp. -2 | Cr | 35-38 | 43-46 | | | 20 | One-layer |
| | Comp. -3a | Cr | 23-25 | 53 | | | 12 | |
| | Comp. -3b | Al | 26-29 | 18 | | | 70 | |
| | Comp. -3c | Cr | 31-35 | 34 | | | 43 | |
| | Comp. -3 | | 77 | 24 | | | | Three-layer |
| | Comp. -4a | Al | 24-26 | | see FIG. 12a | | | |
| | Comp. -4b | Ti | 80-87 | | see FIG. 12a | | | |
| | Comp. -4 | | 93-101 | 50-63 | | see FIG. 12a | | Two-layer |
| | 5 | Al | 80 | 30 | | | 50 | One-layer |
| | Comp. -6 | Al | 112-119 | 54 | | | 10 | One-layer |
| | Comp. -7a | Al | 53 | 38 | | | 37 | |
| | Comp. -7b | Al | 65 | 50 | | | 17 | |
| | Comp. -7c | Al | 49 | 48 | | | 20 | |
| | Comp. -7 | Al | 156-169 | 38 | | | 37 | One-layer |
| | Comp. -8 | Al | 51-60 | 16 | | | 72 | |
| | Comp. -9 | Al | 46-49 | 25 | | | 58 | |
| | Comp. -9a | | | | | | | |
| | Comp. -9b | | | | | | | |
| | Comp. -9c | | | | | | | |

Part D: Characterization of the Profile of Oxygen and Metal Over the Layer Thickness from the Top Face a to the Bottom Face B for Inventive Example 4 and Comparative Example 4 by Photoelectron Spectroscopy (XPS/ESCA) and Sputter Profile Measurements.

For more precise structural characterization, the coated films of inventive example 4 and of comparative example 4 were analyzed by means of ESCA.

Analytical Methods and Instruments Used

Photoelectron Spectroscopy

Photoelectron spectroscopy (ESCA/XPS) can be used to provide a quantitative determination of the atomic composition of the surface of a sample. By means of high-resolution spectra, moreover, it is possible to gain information concerning the chemical bonding state of the individual elements. The information depth with this method is approximately 5-10 nm, the detection limit approximately 0.1 to 1 atom %.

Measurement was carried out using an ESCALAB 250 instrument from Thermo VG Scientific. Excitation took place using monochromatic Al $K_\alpha$ x-ray radiation (15 kV, 150 W, 500 µm spot size). The transmission function of the instrument was measured on a copper sample. Charge compensation was done using a "flood gun" with an electron energy of 6 eV/0.05 mA beam current. The energy position was set for the evaluation such that the carbon main line is at 285 eV.

The settings used for measuring the spectra were as follows:

Overview spectra were measured with a pass energy of 80 eV, high-resolution spectra with 30 eV. On nonmagnetic samples, the magnet lens was used.

Quantitative figures for the surface composition were calculated by means of Scofield factors on overview measurements.

Sputter Depth Profile

For the individual samples, the below-listed distributions of the elements in the depth are given by the depth profiles. The profiles of the individual elements were prepared only to the extent allowed by the data position in the spectra. When the fraction of an element in the analyzed volume is very low, it is not possible to make an unambiguous statement concerning the oxidation state. The layer thickness is defined as the point at which the fractions of the elements under consideration are of equal size. In the case of different metals, the values of both metals are always employed in this context.

Evaluation of Inventive Example 4 (see FIGS. 11a and 11b):

The titanium layer thickness is approximately 55 nm, the aluminum layer thickness approximately 25 nm.

Titanium at the surface is predominantly in oxidized form. In the region from about 10-50 nm layer thickness, it is present in metallic form and in oxidized form at equal fractions.

Aluminum is less strongly oxidized in the "middle" of the aluminum layer than at the layer margins. At the film boundary, the degree of oxidation is higher than at the titanium boundary.

Carbon is present substantially as substrate.

Evaluation of Comparative Example 4 (see FIGS. 12a and 12b):

The titanium layer thickness is approximately 75 nm, the aluminum layer thickness approximately 25 nm.

Titanium at the surface is predominantly in oxidized form. In the region from about 10-70 nm, it is present in metallic form and in oxidized form at equal fractions.

Aluminum is less strongly oxidized in the "middle" of the aluminum layer than at the layer margins. At the film boundary, the degree of oxidation is higher than at the titanium boundary.

Part E: Colorimetric Evaluation of the Inventive Embossed PVD Metallic Effect Pigments and of Pigment Types According to the Prior Art For colorimetric measurement (table 3) of the pigments of inventive examples 1-6 and comparative examples 1-6 and also comparative examples 8, 9, 9a, 9 and 9c, color cards were produced.

TABLE 3

| Substrate | Patent example | External appearance of pigments |
|---|---|---|
| Embossed | 1 | dark bluish metallic, prismatically lustrous pigments |
| | 2 | dark gray metallic, prismatically lustrous pigments |
| | 3a | |
| | 3b | |
| | 3c | |
| | 3 | dark gold, metallic, prismatically lustrous pigments |
| | 4a | |
| | 4b | |
| | 4 | bluish silver metallic, prismatically lustrous pigments |
| | 5 | gold, metallically lustrous, prismatic pigments |
| | 6 | dark gray metallic, prismatically lustrous pigments |
| | 7a | |
| | 7b | |
| | 7c | |
| | 7 | dark gray metallic, prismatically lustrous pigments |
| Unembossed | Comp.-1 | dark bluish metallically lustrous pigments |
| | Comp.-2 | dark gray metallic, prismatically lustrous pigments |
| | Comp.-3a | |
| | Comp.-3b | |
| | Comp.-3c | |
| | Comp.-3 | dark gold, metallically lustrous pigments |
| | Comp.-4a | |
| | Comp.-4b | |
| | Comp.-4 | bluish silver metallic, prismatically lustrous pigments |
| | 5 | gold, metallically lustrous pigments |
| | Comp.-6 | dark gray metallically lustrous pigments |
| | Comp.-7a | |
| | Comp.-7b | |
| | Comp.-7c | |
| | Comp.-7 | dark gray metallically lustrous pigments |
| Embossed | Comp.-8 | silver metallic, prismatically lustrous pigments |
| Embossed | Comp.-9 | silver metallic, prismatically lustrous pigments |
| Embossed | Comp.-9a | brown prismatic pigment mixture |
| Embossed | Comp.-9b | brown prismatic pigment mixture |
| Embossed | Comp.-9c | brown-gray prismatic pigment mixture |

For this purpose, geometrically equal coating areas as per table 4 were detached from each of the carrier films and washed to remove the release coat. Accordingly, except for examples 9b and 9c, the coating areas used were always the same.

The preliminary pigments of inventive examples 1-6 and comparative examples 1-6 and 8 were thereafter suspended in 80 ml of ethyl acetate and comminuted with a Turrax for 5 minutes at a speed of rotation of 24 000 revolutions/min.

The resulting particle sizes (D50 values) are recorded here in table 4.

The very coarse prismatic Metalure with a D50 of 50 μm in comparative example 9 and in comparative examples 9a, 9b, and 9c, which was already present in pigment form, was comminuted accordingly by the process as described above. For the blends of comparative examples 9a, 9b, and 9c, comparative example 9 was likewise comminuted and was thereafter available for the black blends. The resulting particle size of comparative example 9 is likewise recorded in table 4.

Each of the PVD metallic effect pigments from inventive examples 1-6 and from comparative examples 1 and 6 and from comparative examples 8 and 9 was incorporated by stirring as per table 4 into the stated varnish system of a conventional nitrocellulose varnish (Dr. Renger Erco Bronzemischlack 2615e; from Morton). The pigments from comparative examples 9a, 9b, and 9c were incorporated by stirring into a black varnish (5% Noir Covachip W9702ET+ 20% butyl acetate+75% Intern. Lacquers Base 359). In view of the smaller coating areas processed to pigments in comparative examples 9b and 9c, different tints are obtained with the black varnish. In each case, the PVD metallic effect pigment was introduced and was then dispersed into the respective varnish system with the aid of ethyl acetate.

The completed varnish was applied to #2853 test charts from Byk Gardner (black-white contrast paper) in a wet film thickness of 12 μm as specified in table 4, using a drawdown apparatus.

TABLE 4

Color preparations of fine pigments, applied nonhidingly

| Example | Detached pigment area [m²] | Varnish system NC [g] | Varnish system Black varnish [g] | D50 [μm] | Knife depth [μm] |
|---|---|---|---|---|---|
| 1 | 0.435 | 2 | | 10.75 | 12 |
| 2 | 0.435 | 2 | | 8.11 | 12 |
| 3 | 0.435 | 2 | | 17.85 | 12 |
| 4 | 0.435 | 2 | | 30.14 | 12 |
| 5 | 0.435 | 2 | | 17.5 | 12 |
| 6 | 0.435 | 2 | | 20.8 | 12 |
| Comp.-1 | 0.435 | 2 | | 9.55 | 12 |
| Comp.-2 | 0.435 | 2 | | 9.25 | 12 |
| Comp.-3 | 0.435 | 2 | | 16.94 | 12 |
| Comp.-4 | 0.435 | 2 | | 20.5 | 12 |
| Comp.-5 | 0.435 | 2 | | 17.4 | 12 |
| Comp.-6 | 0.435 | 2 | | 20.5 | 12 |
| Comp.-8 | 0.435 | 2 | | 14.6 | 12 |
| Comp.-9 | 0.435 | 2 | — | 12.2 | 12 |
| Comp.-9a | 1 × 0.435 | — | 2 | | 12 |
| Comp.-9b | ¼ × 0.435 | — | 2 | | 12 |
| Comp.-9c | ¹⁄₁₂ × 0.435 | — | 2 | | 12 |

With the levels of pigmentation of the inventive and comparative examples, complete opacity was not practiced, and the measurements were all carried out on the black contrast paper coated with the knife drawdown.

Very thin wet film thicknesses have been found to be particularly attractive, since they emphasize the prismatic effect more strongly to a viewer than, for example, wet film thicknesses of 24 μm or around 50 μm. Additionally it was found that with the thin transparent inventive examples 1 and 2, a rainbow effect can be obtained which has a blue-black shimmering edge. Particularly effective here were, on the one hand, the metal nanoparticles incorporated into the oxidic matrix, as strong absorbers, and additionally, on the other hand, the black card serves as a strong absorber.

As a result of these effects of the black card shimmering through and of the thin, wet film thickness, therefore, it is possible to generate a high-grade color impression of a rainbow with bluish black shimmering edging.

The subjective color impression was recorded by exemplary illumination of the color cards in accordance with the schematic illumination and observation arrangement as per FIG. 15, in table 5. For this purpose, an appropriate device was used to curve the color cards produced, and the curved cards were illuminated by means of three light sources in accordance with FIG. 15. In this case the irradiated light on the one hand impinges vertically onto the curved color card (middle lamp), and in the other case impinges substantially at a 45° angle onto the curved surface. The viewer was then able to view the curved surface from different angles and, accordingly, to simulate light conditions similar to those for the colorimetric measurements (FIG. 16).

Table 5 summarizes the subjective color impressions of the color cards (of the coated black card) illuminated in this way for the three indicated reflection points 24, 25, and 26 as per FIG. 15.

TABLE 5

| | Color impression as per area illuminated at approximately 45° (left) | Color impression in regions of vertical reflection (middle) | Color impression as per area illuminated at approximately 45° (right) |
|---|---|---|---|
| 1 | strong prismatic blue-black shimmer effect | black lustrous | strong prismatic blue-black shimmer effect |
| 2 | strong prismatic blue-black shimmer effect | black lustrous | strong prismatic blue-black shimmer effect |
| 3 | strong prismatic effect | very intense gold lustrous | strong prismatic effect |
| 4 | strong prismatic effect | blue silvery very strongly lustrous | strong prismatic effect |
| 5 | strong prismatic effect | gold lustrous | strong prismatic effect |
| 6 | strong prismatic effect | anthracite lustrous | strong prismatic effect |
| Comp.-1 | intense black | black lustrous | intense black |
| Comp.-2 | intense black | black lustrous | intense black |
| Comp.-3 | gold color flopping to dark | very intense gold lustrous | gold color flopping to dark |
| Comp.-4 | blue silvery shade flopping to dark | blue silvery very strongly lustrous | blue silvery shade flopping to dark |
| Comp.-5 | gold color flopping to dark | pale gold very strongly lustrous | gold color flopping to dark |
| Comp.-6 | shade flopping to dark | anthracite lustrous | shade flopping to dark |
| Comp.-8 | strong prismatic effect | silvery lustrous | strong prismatic effect |
| Comp.-9 | strong prismatic effect | silvery lustrous | strong prismatic effect |
| Comp.-9a | prismatic with rustlike pixelation | gray lustrous | prismatic with rustlike pixelation |
| Comp.-9b | prismatic with rustlike pixelation | dark gray lustrous | prismatic with rustlike pixelation |
| Comp.-9c | prismatic with rustlike pixelation | very strongly dark gray lustrous | prismatic with rustlike pixelation |

The knife drawdowns were subjected to colorimetry in accordance with the manufacturer indications (Optronic Multiflash instrument, Berlin, Germany). Irradiation took place at a constant angle of 45°, and the CIELAB L*, a*, and b* values were determined at observation angles of 15°, 20°, 25°, 45°, 55°, 70°, 75°, and 110° relative to the specular angle (illuminant: D65). This arrangement is also shown exemplarily in FIG. 16.

In addition, the reflectivities of the knife drawdowns were measured, in each case at the corresponding specular angles of 25°, 45°, and 75°, over the visible wavelength range from 400-700 nm.

For investigation of the samples with regard to their homogeneous appearance, the samples were additionally subjected to measurement using a BYK-Mac colorimeter.

Colorimetric Assessment:

1. Colorimetric Assessment of Black Blends of Comparative Examples 9a, 9b, and 9c of Comparative Example 9 with Very Dark Inventive Example 1

1.1 Assessment by Means of L*, H*, and C* Diagrams:

FIG. 13a here first shows the decrease in the lightnesses of the L* values which are brought about by blending comparative example 9 with a black varnish system, since within the black varnish system the pigment fraction of comparative example 9 is reduced in accordance with comparative examples 9a, 9b, and 9c. In comparison to this, example 1 shows an even darker appearance even at observation angles and specular angles of 45°.

The plotting of the H* values against the specular angle or observation angle in accordance with FIG. 13b shows that the prismatic effect in the case of inventive example 1 and of all the comparative examples is clearly evident from the modulation of the color locus in the 15-55° range. Even in the case of comparative example 9c, with its low concentration, the prismatic effect is still developed. At high specular and observation angles (70°-110°), however, the comparative examples exhibit a yellowish or brown color region. In contrast, inventive example 1 shows a distinct blue shade within this range.

The plotting of the C* values—FIG. 13c—for comparative examples 9, 9a, 9b, and 9c shows the attenuation of the chroma through the reduction in the prismatic pigment fraction of comparative example 9 in the applications of the comparative examples from 9a through 9b to 9c.

In comparison to the black varnish blends 9a, 9b, and 9c, example 1 exhibits a surprisingly strong chroma at the observation angles of 20° and 25°. Here, accordingly, the prismatic effect is particularly strong. At 45° and above, the sample already appears to be only black-absorbing.

Figure 13D:
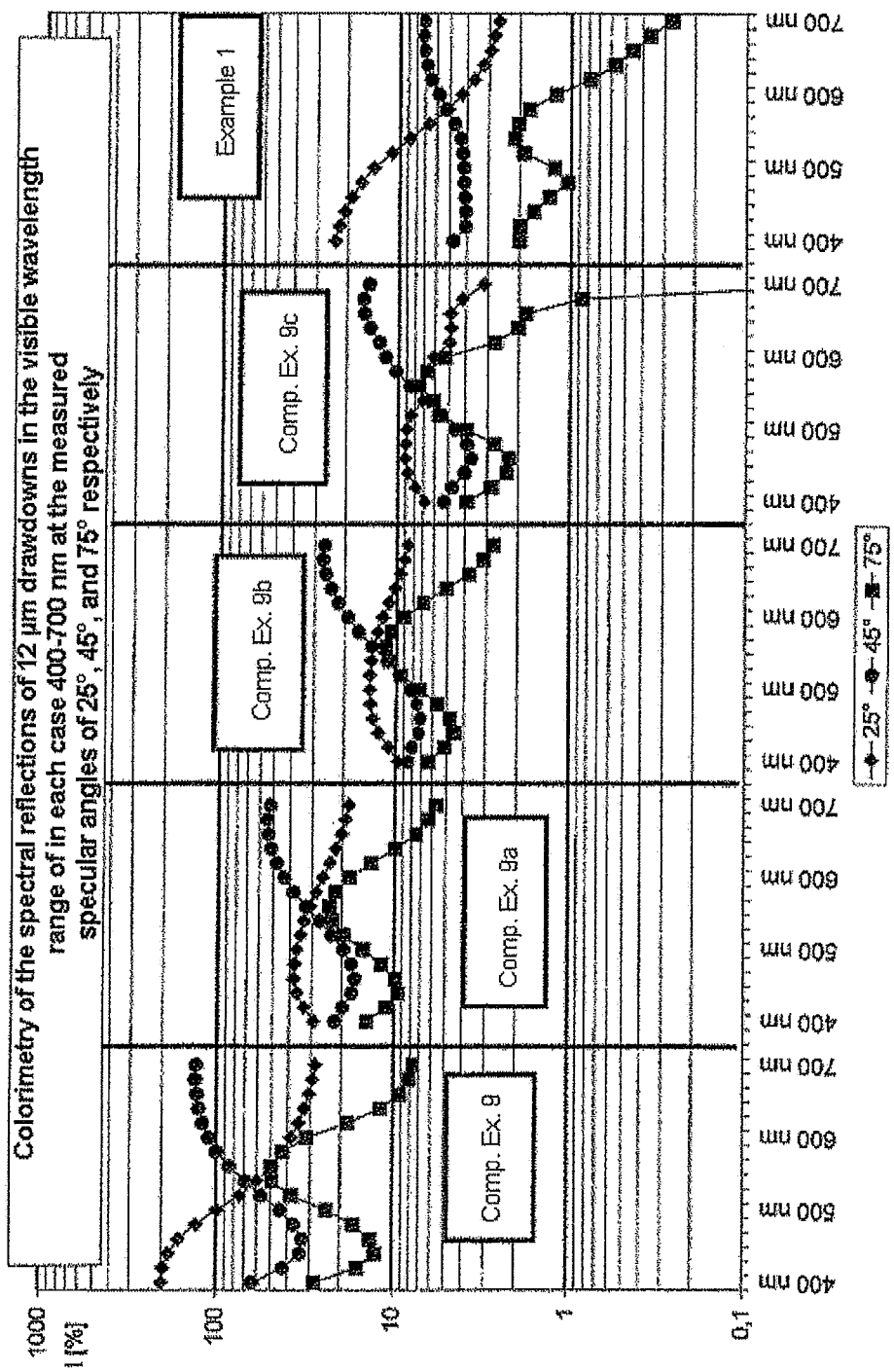

1.2 Assessment by the Plotting of the Spectra:

In order to reinforce and emphasize the colorimetric CIELAB data, it is also possible to employ the recording of the spectra, taken in the same operation, from FIG. 13d.

Interpretation of the spectra from 25°, 45° and 75° over the visible wavelength range of 400-700 nm shows, for comparative example 9, its characteristic profile, with the strongest reflection in the blue region, with viewing direction and direction of illumination as per FIG. 16 onto the color card arranged at 45°.

In the case of comparative examples 9a, 9b, and 9c, the reflectivity at an angle of 25° is strongly reduced after reduction of the pigment content in the blue wavelength range, and a maximum reflectivity here is already observed at 45°, conversely, in the red wavelength range. At 75° the reflectivity relative to comparative example 9 is also reduced, but not as greatly as in the case of inventive example 1.

Entirely surprisingly, the pigments of inventive example 1 in comparison show on the one hand a strong spectral splitting of the light into the specular angle around 25°, with a maximum in the blue wavelength range, and, on the other hand, a very strong flop to dark at observation angles of just 45° as per FIG. 15.

2. Colorimetric Assessment of Embossed Pigments Relative to Pigments According to the Prior Art In order to illustrate the difference between the embossed pigments of inventive examples 1-6 and of comparative examples 8 and 9 relative to pigments without an embossed structure, it is possible to employ the colorimetric evaluation of the H* profiles. This comparison is made possible by FIGS. 14a and 14b.

Whereas, for all of the embossed examples, there is a similar characteristic wavelike profile observable over the entire color range ("rainbow"), comparative examples 1 and 4 exhibit a horizontal profile. The gold-colored comparative examples 3 and 6, in contrast, exhibit a steep flop of the gold color into the dark region. None of the comparative examples gives a rainbow effect even anywhere approximately close to that of the embossed pigments.

3. Assessment for Homogeneity and of the "Sparkle Effect" of the Color Cards:

The sparkle effect and the granular nature of a surface have for a long time been available only to the subjective impression of the viewer, and have not been quantifiable. In 2008, however, the company BYK-Gardner brought onto the market a new instrument (BYK-mac®) allowing these effects to be quantified for the first time. The sparkle effect is generated with the aid of very bright white LED lamps which illuminate the surface from three different illumination angles (15°, 45°, and 75° relative to the normal). The granularity is visualized by diffuse illumination of the surface with the aid of an Ulbricht sphere. Using a high-resolution CCD camera placed perpendicular to the surface, an image is taken of the surface, and an instrument-internal algorithm calculates for each illumination direction, from the intensity and distribution of the lightness patterns, the "sparkle intensity", which reflects the lightness of the individual faces; the "sparkle area", as a measure of the total surface area of the sparkling points; and also the granularity characteristic. Derived from the two sparkle parameters is the "degree of sparkle", which correlates to the visual impression: the higher this figure, the greater the extent to which an observer perceives the sparkle effect of a surface.

The abovementioned drawdowns of the inventive examples and of the comparative examples in accordance with table 4 were subjected to measurement accordingly using this instrument.

The results of the measurements showed that a more homogeneous appearance was produced with the embossed structure selected—FIG. 18—of the inventive examples, in comparison to comparative example 9, with an embossed structure in the form of a linear pattern.

The invention claimed is:

1. A metallic effect pigment consisting of
(a) a single layer which comprises metal nanoparticles and a metal oxide phase, the metal of the metal oxide phase and the metal of the metal nanoparticles being identical in the layer, wherein the layer has a diffractive structure and wherein the layer has a first outer face and a second outer face, the amount of metal nanoparticles in the first outer face differs from the amount of metal in the second outer face by at least 10 atom % or
(b) two layers disposed one atop the other, with at least one layer comprising metal nanoparticles in a metal oxide phase, and the metal of the metal oxide phase and the metal of the metal nanoparticles being identical in the at least one layer, wherein the at least one layer has a first outer face and a second outer face, the amount of metal nanoparticles in the first outer face differs from the amount of metal in the second outer face by at least 10 atom %, and wherein the two layers have a diffractive structure wherein the metallic effect pigment exhibits an optical rainbow effect from diffraction of incident light at the diffractive structure.

2. The metallic effect pigment of claim 1, wherein the metal of the at least one layer which comprises metal nanoparticles and metal oxide phase is selected from the group consisting of aluminum, magnesium, chromium, silver, copper, gold, zinc, tin, manganese, iron, cobalt, nickel, titanium, tantalum, molybdenum, tungsten, mixtures thereof, and alloys thereof.

3. The metallic effect pigment of claim 1, wherein the average size of the metal nanoparticles is in a range from 1 to 50 nm.

4. The metallic effect pigment of claim 1, wherein in the at least one layer which comprises metal nanoparticles and metal oxide phase, the average content of metal M and oxygen is at least 80 atom%, based on this one layer.

5. The metallic effect pigment of claim 1, wherein the at least one diffractive structure has at least one periodic pattern with diffractive elements.

6. The metallic effect pigment of claim 5, wherein the periodic pattern has 5000 to 20,000 diffractive elements/cm.

7. The metallic effect pigment of claim 1, wherein the diffractive structure has a depth of at least 40 nm.

8. The metallic effect pigment of claim 1, wherein an average layer thickness of the at least one layer which comprises metal nanoparticles and metal oxide phase is in a range from 8 to 500 nm.

9. The metallic effect pigment of claim 1, wherein the amount of metal nanoparticles changes continuously over the thickness of the at least one layer which comprises metal nanoparticles and metal oxide phase.

10. The metallic effect pigment of claim 9, wherein the amount of metal nanoparticles changes at least partly with a gradient of 0.1 to 4 atom%/nm over the thickness of the at least one layer which comprises metal nanoparticles and metal oxide phase.

11. The metallic effect pigment of claim 1, wherein the amount of metal nanoparticles changes discontinuously between two successive layers.

12. The metallic effect pigment of claim 1, wherein the metal is a trivalent metal and the metallic effect pigment has at least one first and one second successive layer, the first layer comprising metal nanoparticles and the second layer comprising elemental metal, the amount of metal nanoparticles in the outer face of the first layer, which comprises metal nanoparticles and metal oxide phase, being in a range from 1 to 50 atom%, and the amount of elemental metal in the outer face of the second layer being in a range from 60 to 95 atom%, with the proviso that the difference in the amount of metal nanoparticles and of elemental metal in the two outer faces is at least 10 atom%.

13. The metallic effect pigment of claim 1, wherein the metal is a tetravalent metal and the metallic effect pigment has at least one first and one second successive layer, the first layer comprising metal nanoparticles and the second layer comprising elemental metal, the amount of metal nanoparticles in the outer face of the first layer, which comprises metal nanoparticles and metal oxide phase, being in a range from 1 to 50 atom%, and the amount of elemental metal in the outer face of the second layer being in a range from 60 to 95 atom%, with the proviso that the difference in the amount of metal nanoparticles and of elemental metal in the two outer faces is at least 10 atom%.

14. The metallic effect pigment of claim 1, wherein the at least one layer which comprises metal nanoparticles and metal oxide phase has an average oxygen content of 30 to 77 atom%, based on the total amount of metal and oxygen in this layer.

15. A coating composition comprising the metallic effect pigment of claim 1.

16. An article provided with the metallic effect pigment of claim 1.

17. The metallic effect pigment of claim 5, wherein the at least one diffractive structure has at least one periodic pattern with diffractive elements comprising geometric shapes or bodies.

18. The metallic effect pigment of claim 1, wherein the diffractive structure is selected from the group consisting of symmetrical triangles, asymmetrical triangles, grooves, rectangles, circles, wavy lines, cones, truncated cones, knobs, prisms, pyramids, truncated pyramids, cylinders, hemispheres, and combinations thereof.

19. The metallic effect pigment of claim 1, wherein the metallic effect pigment further comprises smooth sections present on the metallic effect pigment surface.

20. The metallic effect pigment of claim 1, wherein at least one outer face has a depth of approximately 10 nm.

21. The metallic effect pigment of claim 1, wherein the layer or layers further comprise extraneous elements selected from the group consisting of one or more of nitrogen, sulfur, carbon, hydrogen.

22. A coated article coated with a coating composition comprising the metallic effect pigment of claim 1.

23. The metallic effect pigment of claim 1, wherein the metal of the at least one layer which comprises metal nanoparticles and metal oxide phase is selected from the group consisting of aluminum, chromium, titanium, tantalum, mixtures thereof; and alloys thereof.

24. The metallic effect pigment of claim 1, wherein the average size of the metal nanoparticles is in a range from 1 to 10 nm.

25. A process for preparing the metallic effect pigment of claim 1, comprising:
 (a1) applying a release layer to a linearly movable substrate,
 (a2) introducing a diffractive structure into the release layer, preferably by embossing, and
 (a3) applying at least one metal to the release layer on the linearly movable substrate, in a vacuum chamber having a vapor-deposition section, by means of reactive physical vapor deposition (PVD), in the presence of oxygen, or (b1) applying a release layer to a linearly movable substrate,
 (b2) applying at least one metal to the release layer on the linearly movable substrate, in a vacuum chamber having a vapor-deposition section, by means of reactive physical vapor deposition (PVD), in the presence of oxygen, and (b3) introducing a diffractive structure onto and/or into at least one surface of the PVD layer applied in step (b2), preferably by embossing, and also c) detaching the applied PVD layer(s) provided with a diffractive structure,
d) comminuting the detached PVD layer(s),
e) optionally transferring the comminuted PVD layer(s) into a dispersion or paste.

* * * * *